US006994362B2

(12) United States Patent
Foster

(10) Patent No.: US 6,994,362 B2
(45) Date of Patent: Feb. 7, 2006

(54) ATTACHMENT MEANS FOR FACILITATING USER ACCESS TO VEHICLE PLATFORMS

(76) Inventor: Allan Eugene Foster, 22 Orange Blossom Trail, Yalaha, FL (US) 34797

( * ) Notice: Subject to any disclaimer, the term of this patent is extended or adjusted under 35 U.S.C. 154(b) by 109 days.

(21) Appl. No.: 10/428,242

(22) Filed: May 2, 2003

(65) Prior Publication Data
US 2004/0217573 A1  Nov. 4, 2004

(51) Int. Cl.
B60R 3/00 (2006.01)
(52) U.S. Cl. .................................. 280/163; 280/166
(58) Field of Classification Search .............. 280/163, 280/164.1, 164.2, 169, 416.3, 456.1, 495, 280/500, 501, 504, 505, 515, 166
See application file for complete search history.

(56) References Cited

U.S. PATENT DOCUMENTS

| 3,329,443 | A | * | 7/1967 | Lowder et al. | 280/166 |
|---|---|---|---|---|---|
| 3,572,753 | A | * | 3/1971 | Claassen | 280/166 |
| 3,758,134 | A | * | 9/1973 | Stewart | 280/163 |
| 3,762,742 | A | * | 10/1973 | Bucklen | 280/166 |
| 3,912,299 | A | * | 10/1975 | Carr | 280/166 |
| 3,981,515 | A | * | 9/1976 | Rosborough | 280/166 |
| 4,648,617 | A | * | 3/1987 | Hannappel | 280/304.3 |
| 5,108,121 | A | * | 4/1992 | Collis | 280/414.1 |
| 5,617,930 | A | * | 4/1997 | Elia | 182/97 |
| 5,716,064 | A | * | 2/1998 | Frerichs | 280/166 |
| 5,732,996 | A | * | 3/1998 | Graffy et al. | 296/62 |
| 5,738,362 | A | * | 4/1998 | Ludwick | 280/166 |
| 5,897,125 | A | * | 4/1999 | Bundy | 280/166 |
| 5,915,714 | A | * | 6/1999 | Bell et al. | 280/456.1 |
| 6,042,135 | A | * | 3/2000 | Ross | 280/456.1 |
| 6,170,842 | B1 | * | 1/2001 | Mueller | 280/163 |
| 6,170,843 | B1 | * | 1/2001 | Maxwell et al. | 280/166 |
| 6,234,512 | B1 | * | 5/2001 | Bettenhausen | 280/491.1 |
| 6,237,927 | B1 | * | 5/2001 | Debo | 280/166 |
| 6,471,002 | B1 | * | 10/2002 | Weinerman | 182/91 |
| 6,511,086 | B2 | * | 1/2003 | Schlicht | 280/166 |
| 6,530,588 | B1 | * | 3/2003 | Varney et al. | 280/166 |
| D477,555 | S | * | 7/2003 | Ruffin | D12/203 |
| 6,682,086 | B1 | * | 1/2004 | Erickson | 280/166 |
| 6,685,204 | B1 | * | 2/2004 | Hehr | 280/166 |
| 6,742,799 | B1 | * | 6/2004 | Hansen | 280/495 |

(Continued)

FOREIGN PATENT DOCUMENTS

| CA | 1219020 | * | 3/1983 |
|---|---|---|---|
| EP | 0 210 465 A2 | * | 3/1986 |

Primary Examiner—J. Allen Shriver
Assistant Examiner—Christopher Bottorff
(74) Attorney, Agent, or Firm—Edward P. Dutkiewicz

(57) ABSTRACT

Improved selectively rotatable multipositionable step attachment for a vehicle platform and the like for not only facilitating safe user access to the platform, for loading and unloading same, when the step attachment is in an operative position, but also when it is in a non operative or stowage position for facilitating additional use of the platform such as for towing another platform or for facilitating attachment of an auxiliary platform to the vehicle platform. The step attachment is generally made up of a support bar, a rotatable step tread of L-shaped configuration, a multiappatured index plate concentrically affixed to the outer end of either the support bar or the rotatable step tread, and a device to fasten the step assembly to the vehicle platform. Depending on the various requirements of the step attachment when being connected to a vehicle platform and the like, various mounting arrangements are provided.

8 Claims, 21 Drawing Sheets

U.S. PATENT DOCUMENTS

2002/0008364 A1 * 1/2002 Kahlstorf

D494,117 S * 8/2004 Ruffin ....................... D12/203

* cited by examiner

ATTACHMENT MEANS FOR FACILITATING USER ACCESS TO VEHICLE PLATFORMS

CROSS REFERENCE TO RELATED APPLICATIONS

Not Applicable

STATEMENT REGARDING FEDERALLY SPONSORED RESEARCH OR DEVELOPMENT

Not Applicable

DESCRIPTION OF ATTACHED APPENDIX

Not Applicable.

ROTATABLE STEP ATTACHMENT

This invention relates generally to the field of a step, having several working positions which can be achieved by rotating the step around a fixed pivot, and more specifically to a machine to assist a person entering into a vehicle or on a machine.

HISTORY OF THE INVENTION

This invention relates to any type of platform such as Pickup trucks, SUV's, and construction equipment, etc. where user access is required. These vehicles are often very difficult to climb on or into because of their height above the ground. My invention provides an improved selectively rotatable step attachment that is not only positionable in more than one working position, but also in a stowable position when the platform is being used for other purposes. Each position is easily lockable in it's working position, or stowage position. The improved rotatable step is attached to the vehicle frame, trailer hitch, or other substantial part of the vehicle providing a safe method of entry.

For many people getting into the rear of a pickup truck, for example, involves sitting on the opened tailgate then swinging their legs up to the tailgate, then kneeling on the tailgate and finally to the standing position. This exercise is time consuming, tiring, and sometimes embarrassing or unsafe. With my invention a person with modest agility can step up to the improved rotatable step, then onto the tailgate, remaining on their feet at all times.

The improved attachment [rotatable step] is normally positioned for stowage in a clearance between the ground and the lower portion of the platform of a vehicle at one end thereof. A working step height is normally one half the distance from the ground to the platform [tailgate] height. By reason of the improved step attachment both feet of the user are stably supported as the user accesses any platform, for servicing, loading/unloading or maintaining the vehicle. If necessary, for additional safety any user can readily attach the hand support bar for additional support when accessing a platform. Without the improved step attachment any one accessing a raised platform from the ground would have to do so in a cumbersome, awkward, and unsafe fashion, that could lead to personal injury.

SUMMARY OF THE INVENTION

My invention essentially comprises a rotatable step assembly that is attached to a platform providing improved access to the side, rear, and roof of the vehicle. The device pivots into various operative positions, including a stowage position, and is locked in position, before a safe climb or vehicle movement is attempted.

The "Rotatable Step" Assembly for Vehicle Platforms, essentially comprises three main sub assemblies, [for illustration a pickup truck is used as the vehicle platform]

A)—an accessory receiver and vehicle mount assembly, which can be attached to the frame, trailer hitch, or other substantial part of the vehicle, hereafter called "accessory receiver". The "accessory receiver" establishes the working height above the ground for the rest of the pivot step components, and defines the connection to the vehicle platform. The "accessory receiver" can have many geometries, depending on 1) height of the tailgate from the ground, 2) location of the receiver of the vehicle's trailer hitch, frame, or substantial mounting surface for the step. 3) accessible clearance under the vehicle for safe step stowage while traveling and 4) desired access locations, left or right and front or back of the vehicle. With these variations each model of vehicle could have a unique "Rotatable Step" designed around a series of standard components provided by the company.

One means of attaching the "accessory receiver" to the vehicle platform is by fitting the extension bar of the accessory receiver into the receiver of the vehicle's existing trailer hitch. At the distal end of the extension bar is secured a drop bar, mounted vertically downward at 90 degrees, to the extension bar, to achieve the proper vertical elevation for the "Rotatable Step". Mounted to the drop bar is a dually opposed receiver with receiver openings facing left and right, capable of accepting accessories, such as a rotatable step, from either of it's open ends. This dual receiver is normally horizontal to the ground in its assembly to the drop bar.

An alternate design for the "accessory receiver" uses one or both of the open ends of an existing industry standard trailer hitch, mounted on the vehicle platform. The accessory device such as a pivot step, is inserted into the end of the main horizontal tubular support member of the trailer hitch, providing with adoption, horizontal receivers at both the left and right end of the trailer hitch. Subsequent subassemblies required for the completion of the pivot step are installed into either of these horizontal sideways receivers, being held in place by a hitch pin and clip. Height adjustments for the final location of the pivot step are provided in the subsequent components. Trailer hitch manufacturers may provide the required revisions during their assembly of the standard trailer hitch, or field conversion for "End Mounted" accessories is also possible.

A Frame mounted "accessory receiver" has been designed and proven successful by affixing horizontal and vertical structural members to the truck frame which in turn support a receiver tube facing rearward on the vehicle platform and some 12 to 18 inches to the right or left of the centerline of the vehicle. This frame mounted receiver then is fitted with the remainder of the parts required for a rotatable step, right or left. The proper rotatable step height is achieved by adjusting the vertical structural member's length. The surface of the rotatable step is normally located approximately one half the distance from the ground to the tailgate. Thus different height dimensions are required for the "accessory receiver" to accommodate differing vehicle platform heights. The company supplies these various "accessory receivers" under the standard components listing.

My invention also uses a frame mounted mini bumper as an "accessory receiver". This mini bumper is essentially an additional bumper mounted under or lower than the original bumper, and is added to the front or rear of a high platform vehicle, having a rearward facing receiver centered in the bumper face, and two opposed openings "accessory receivers" facing left and right at the extreme ends of the mini bumper. Into these horizontal "accessory receivers" accessories such as a rotatable step or the like may be installed. The mini bumper is mounted to the frame of the vehicle platform in the same fashion as standard trailer hitches, using similarly formed steel plate brackets, in it's present embodiment, giving a substantial support to the mini bumper for it's dual purpose of "accessory receiver" and as a bumper.

A four wheeled vehicle, having a top of platform height [tailgate height] of 36 inches may have a bumper height of 32 to 24 inches above the ground, placing it several inches above the bumper height of a conventional automobile. With safety as a major consideration, a mismatched bumper height means that the automobile's bumper will slide under the high truck bumper with considerable damage to the auto and possible severe personal injury to it's occupants. If however the truck were equipped with a mini bumper instead of the currently standard trailer hitch, the bumper height mismatch would not exist, since the mini bumper would be the same height as the automobile bumper. It is my understanding that the majority of automobile crash tests are conducted using a flat wall as the crash barrier, with the resulting impact being absorbed by distortion of all the various components of the front of the vehicle. With the automobile bumper being low enough to slide beneath the truck bumper, it is felt there is little chance for the automobile bumper and the front part of the frame to help with this impact distortion and it's proportionate impact absorption. It is likewise felt that insurance claims, as well as personal injuries, could be reduced by installing a mini bumper or full width lower bumper, on high bumper vehicles, front and back.

B)—a pivot pin and pivot pin extension bar assembly, which is attached to the "accessory receiver", and hereafter is called a "pivot pin bar". The pivot pin and pivot pin extension bar assembly consists firstly of an extension bar adapted to fit within the accessory receiver, and is secured thereto by means of a hitch pin. This extension bar is essentially parallel with the rear of the vehicle and normally below the vehicle bumper location. At the distal end of the extension bar is located a vertical pivot pin on which the pivot step can be rotated in a horizontal plane into it's several working positions and it's stowage position. Pivot pin bars fit into either the right or left receiver of the "accessory receiver", giving flexibility of installing a pivot step on either side of the vehicle platform.

C)—a step assembly, comprising an L shaped bar and a non slip tread and having a bushing which serves as a pivot for the step assembly, and hereafter is called a "step assembly". This unique L-shaped design for the step support beam gives one of the solutions for the proper positioning of the tread to have access to the multiple working positions and stowage position claimed by my invention. The non slip tread, being large enough to support both feet at one time, is fastened to the L-shaped bar on one leg of this bar while the pivot hole, index plate, and locking holes are located at the distal end of the other leg. This "step assembly" will fit either the left or right positioned "pivot pin bar", giving the option of installing the pivot step on either side of the vehicle platform.

Additionally a locking index plate fastened to the step support bar has a number of holes, corresponding to each of the working and stowage positions, located around the pivot pin bushing hole. As the "step assembly" is rotated around the pivot pin, a hole in the index plate will align with a matching hole in the pivot pin extension bar, permitting a hitch pin to be installed, locking the step in a safe working position. Each of the working and stowage positions for the step, has it's own indexing lock hole in the index plate, providing easy unlocking, repositioning, and relocking by removing, repositioning and reinsertion of the hitch pin.

The uniqueness of the pivot step dictates the location of the pivot pin on the "pivot pin bar" and the geometry of the L shaped step support bar in relation to the truck platform. These features enable the tread to be positioned in at least four positions, including a stowage position. To satisfy the multiple height, position, location, and stowage clearances for each vehicle, a multiplicity of designs is required for each of the three subassemblies comprising the "pivot step". The subassemblies are;

A—"accessory receiver",
B—"pivot pin bar",
C—"step assembly".

To enable a local dealer of truck accessories or trailer parts to quickly satisfy a customers requirements a business structure is provided comprised of; 1) dealer inventory of standard components, which can be assembled in a unique fashion for diverse customer requirements. 2) dealer or company use of standard vehicle clearances as developed on software for a preassembly visual presentation. 3) dealer or company use of software showing scaled drawings of the standard components, which can be used to assemble on the computer the unique steps for various vehicles or other accessories. 4) dealer or company use of a personal computer, using items 2, and 3 above to develop visual presentations of step assemblies for final assembly,and as a sales aid.

PRIOR TECHNOLOGY

U.S. Pat. No. 6,170,843 to Maxwell describes a step giving access to the side of a tailgate in the down position. U.S. Pat. No. 6,170,842 to Mueller shows a step which is bumper mounted on a horizontal pivot enabling an L shaped step to pivot downward to it's working position or to be raised to a storage position on top of the bumper. U.S. Pat. No. 6,237,927 to Debo shows a small step on a bar which slides out to permit entry into the rear of the lowered tailgate position. This device is attached to the main carrying beam of an existing trailer hitch, using a clamp arrangement. U.S. Pat. No. 5,897,125 to Bundy has a step which pivots into its working position from a travel position under the truck. This device is attached to the front spring mount and is intended to be used for easier access to, and for retrieving items out of the truck bed. U.S. Pat. No. 5,738,362 to Ludwick has a step which inserts into a standard trailer hitch receiver and pivots to a storage position under the receiver when not in use. U.S. Pat. No. 5,732,996 to Graffy et al shows a step attached to the inside of the tailgate for storage when the tailgate is in the up position, and hangs down over the end of the tailgate when in use. U.S. Pat. No. 5,716,064 to Frerichs describes a pull out step which is attached to the vehicle by bolting to the front spring mount of the vehicle. U.S. Pat. No. 5,617,930 to Elia describes a ladder which can be fastened to the upper face of the tailgate, when in the down position, to give access to the back of the truck. U.S. Pat. No. 3,758,134 to Stewart shows a step designed to pivot out of the way when it strikes a protruding object, having as it's intended use, as a step for entry to the cab of a high access truck.

Canadian Pat. No 1,058,251 to Kirkpatrick has a pivoting step which pivots to one working position. Canadian Pat. No 1,219,020 to Yont relates to a step which has a permanently mounted bumper bracket, into which is inserted a step having a square L shaped support member.

None of these patents, however, whether taken alone or in combination, show the rotatable step with multiple working positions and stowage position, which my invention discloses. Also none of these patents anticipate the, diversity of design required to satisfy the requirements of various vehicles manufactured world wide, nor the computer, business, and design system required to backup a dealer sales network.

DEFICIENCY IN PRIOR DESIGNS

While the prior patents solve a singular problem, none of them has the versatility of three working positions,able to be locked into position, and a stowage position locked under the vehicle for travel. These positions are; 1) for access to a roof rack on a vehicle equipped with a bed cap or for loading or unloading the bed of a truck, not having a cap. 2) for easy and safe access to the side of a truck tailgate in the down position, where additional safety can be had be installing a handle either on the truck or on the cap. 3) for easy access to the rear of a truck with the tailgate in the up position. 4) a stowage position under the vehicle with safe vehicle travel possible. Further enhancements my invention provide are; the ability to have rotatable step assemblies service either left or right hand, or both sides of the vehicle at one time; the ability to use the pivot pin as a support for other rotatable accessories; the safety feature of having a lower bumper which serves the dual purpose of being a bumper with matching bumper heights with an automobile and as an "accessory receiver" capable of supporting a pivot step or the like, on either or both sides of the vehicle platform.

With the subassemblies being pinned together there is an advantage in being able to have a relatively small number of standard components be able to be assembled into many different final assemblies. Each vehicle has it's own parameters to develop the geometry required to position the pivot pin in precisely the correct location to achieve the four step positions. Height of the tailgate above the ground: under truck clearance for the step stowage: location of the vehicle trailer hitch, frame support or other substantial mounting surface to support the swivel step: and desired access locations, left or right and front or back of the vehicle, provide the data necessary to assemble a unique swivel step. This phase of the patent submission will then satisfy the diverse customer step requirements, and other accessory development. Also individual "standard components", such as a "double ended receiver with a four inch drop" may be sold as individual components. None of the patents researched addresses these issues.

None of the researched patents speaks to the complex design and assembly problems of providing for the dimensional changes required for different vehicles and how to provide a system for solving them. With my invention dealers and the company will have the capability to design and install unique step assemblies on site, using "standard components" as provided by the company.

The primary object of the invention is To provide a rotatable step to permit easier access to vehicle platforms with relatively high entry levels.

Another object of the invention is To additionally provide a means of securing this step to a machine or vehicle to permit multiple step positions, permitting multiple uses for said step.

Another object of the invention is To additionally provide a step position locking device to hold the step securely in place while in use.

A further object of the invention is To provide a means of storing the step in a location which will permit safe operation of the machine or vehicle,while step is mounted to the machine or vehicle platform.

Yet another object of the invention is To provide a means of attachment of the step device to the vehicle using a receiver of an industry standard trailer hitch.

Still yet another object of the invention is To provide alternate means of attachment of the step device by mounting directly to the bumper.

A further object of the invention is To provide a mini bumper located directly under the standard vehicle bumper giving a much safer height match for typically lower automobile bumpers. Yet another object of the invention is to have a lower bumper equipped with a center receiver, two accessory receivers, and effectively being able to replace the industry standard receiver type trailer hitch.

Still another object of the invention is To provide a mini bumper with a smooth surface with no protrusions, as normally presented by the receiver and safety chain fastening plate on a standard trailer hitch.

A further object of the invention is To provide in a lower full width vehicle bumper, a recessed center receiver as well as two recessed accessory receivers, located on the left and right of the center receiver, attached to the frame of the vehicle.

A further object of the invention is To provide a substantial truck frame mounted lower bumper capable of having two pivoting accessories mounted on either side of the vehicle platform, such as a rotatable step on one side and a pivoting cargo tray on the other side, facilitating pivoting the cargo tray out of the way so the vehicle rear door can be opened then a pivot step can be locked into place permitting a person to enter the vehicle.

Another object of the invention is To provide a step position which will give better access to vehicle mounted roof racks, and items fastened thereon.

Still another object of the invention is To provide a step position which will give single or multiple treads, at appropriate levels from the ground to gain access to (for example the tailgate of a pickup truck).

Another object of the invention is to provide a step tread large enough to place both feet at one time, giving a secure method of balancing yourself.

A further object of the invention is To provide a step position which will give single or multiple treads for a person to climb on machinery, farm machinery, construction machines, trucks, and the like.

Yet another object of the invention is To provide a step position which will give easier access to a vehicle bumper, for entry into the rear of (for example a pickup truck with the tailgate up).

Still yet another object of the invention is To provide a step giving elevated access on over the road trucks and other high vehicles to clean windshields, do repair work, or provide elevated access to other parts of the vehicle using a rotatable step.

Another object of the invention is To provide an optional center receiver extension, to the company fabricated "accessory receiver", giving the ability to install and use a standard trailer hitch and ball insert to tow an auxiliary platform.

Another object of the invention is To provide multiple ways of fastening the step to the primary machine or vehicle platform, and providing multiple ways for rotating and locking said pivot step safely into position,using manual, air, hydraulic, electric, mechanical or a combination of the like to achieve this purpose.

A further object of the invention is To provide an optional detachable safety handle bar to assist user access to a vehicle platform.

Another object of the invention is To provide subassemblies which can be detached from one another to permit revisions or adjustments in the final pivot step installation.

A further object of the invention is To provide a computer design system which gives a dealer software which can be used to utilize standard components, provided by the company,to assemble unique step configurations to fit most vehicle or customer requirements. Special components may be ordered from the company, and the company will increase the standard components, and the software drawings as necessary.

Other objects and advantages of the present invention will become apparent from the following descriptions, taken in connection with the accompanying drawings, wherein, by way of illustration and example, an embodiment of the present invention is disclosed.

In accordance with the present invention,a step with a nonskid tread is used to assist a person in climbing into a elevated vehicle, such as a 4×4 pickup truck. This step is able to be locked into multiple working positions, as well as a stowage position under the vehicle for travel. The various working positions and the stowage position are achieved by rotating the step support around a vertical pivot pin with a locking pin engaging holes in the step support to secure the step safely in one of the working or the stowage positions. Multiple means are described for fastening the step support to the vehicle, but are not to be considered as the only way to accomplish this task. Additionally, a computer design system is described in which a computer with company supplied software is used to design unique pivot step applications for the various vehicles on the road. This computer software also gives drawings of the company supplied standard components which when assembled on the computer will provide a complete design for customer approval and final shop assembly.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
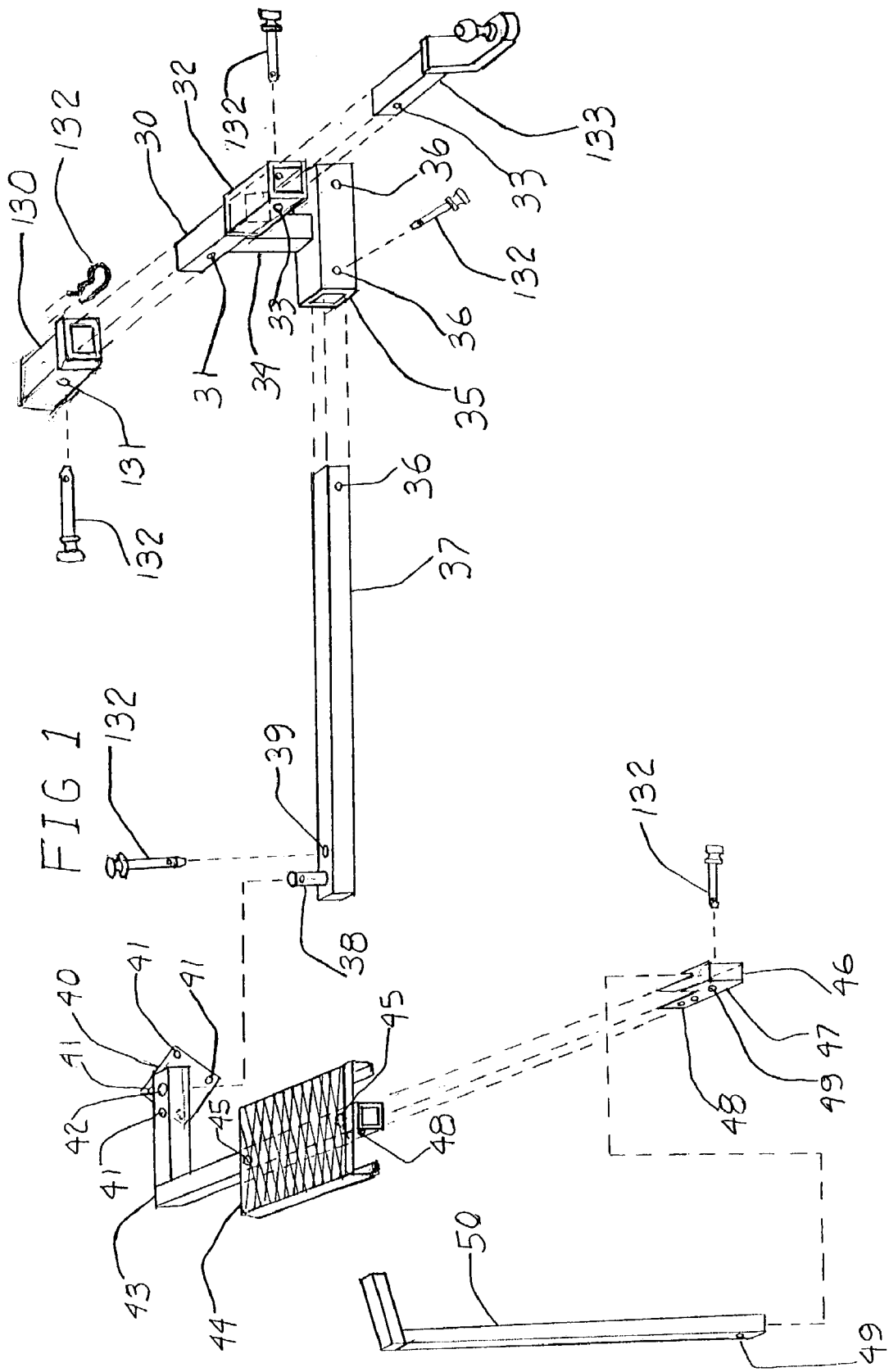
FIG. 1 is an isometric drawing of the rotatable step mounted as an accessory in the receiver of a commercially available trailer hitch.

Turning first to FIG. 1 there is shown an isometric view of a rotatable step assembly with all it's components as mounted in the receiver of a conventional receiver type trailer hitch 130, and secured in place with a hitch pin and clip 132 in hole 131. An "accessory receiver" is shown comprising components 30 through 36 and is fabricated by welding or the like. The center receiver extension bar 30 is normally a solid member to support weight of a trailer or other platform being towed. Tubular member 32 is suitably fastened to the extension bar 30 and will accept a commercially available trailer ball holding device 133, and is locked in place by a standard hitch pin and clip 132 placed in hole 33. The accessory receiver is further comprised of a vertical member 34 which establishes the correct vertical dimension for the horizontal rotational plane in which the step operates. Attached to the drop bar 34 is the dual receiver 35 which can accept accessories, secured by hitch pins 132 in holes 36, from either or both sides at once, permitting accessories such as rotatable steps to be installed on either side of the vehicle, obstructions such as exhaust pipes permitting.

The "pivot pin bar" with components 36 through 39 extends the step support from the "accessory receiver" 30 to 36 to the critical pivot pin 38, on which the step can be selectively rotated. The extension bar 37 is inserted into the dual receiver 35 and held in place by another hitch pin and clip 132 in holes 36. Hole 39 serves to lock the step in it's various positions, when assembled with the indexing plate 40 and step locking hole 41.

The last of the major subassemblies "step assembly" uses components numbering from 40 through 45, with the safety handle adding components 46 through 50. The complete "step assembly" 40 to 45 is placed on the pivot pin 38 utilizing bushing hole 42, on which said step assembly rotates in a horizontal plane. To lock the step assembly in one of it's working or stowage positions one of the four step locking holes 41 in the indexing plate 40 is aligned with the pivot locking hole 39 and the hitch pin 132 and clip inserted. To reposition the step to another location the hitch pin in holes 39 and 41 is removed, the "step assembly" is manually rotated to a new position, and the hitch pin is reinserted into a new hole 41 in the indexing plate 40, and hole 39 in the "pivot pin bar".

Fabrication of the "step assembly" is by bolting, forming welding and the like with hitch pins or the like holding the major subassemblies together. The L shaped step support 43 holds the slip resistant tread 44 in place using fastening devices 45. At the distal end of the step support 43 the indexing plate 40 is fastened with a hole 42 matching hole 42 in the L shaped support bar 43. The indexing plate 40 also has four concentric equally spaced holes 41 which give rotational positioning for each of the step positions.

Safety handle accessory 46 to 50 is attached to the L shaped step support 43 near the tread 44 using conventional fasteners in holes 48 to secure the safety handle support 47. This support 47 has a stop on the bottom 46 which holds the safety handle 50 in place while the hitch pin 132 and clip are inserted in holes 49 securing the handle 50 in place. The safety handle support 47 can be a permanent add on to the L shaped bar 43, but the safety handle 50 must be removed for the "step assembly" to be rotated into the stowage position under the truck 51. [FIG. 4 ]

Figure 2:
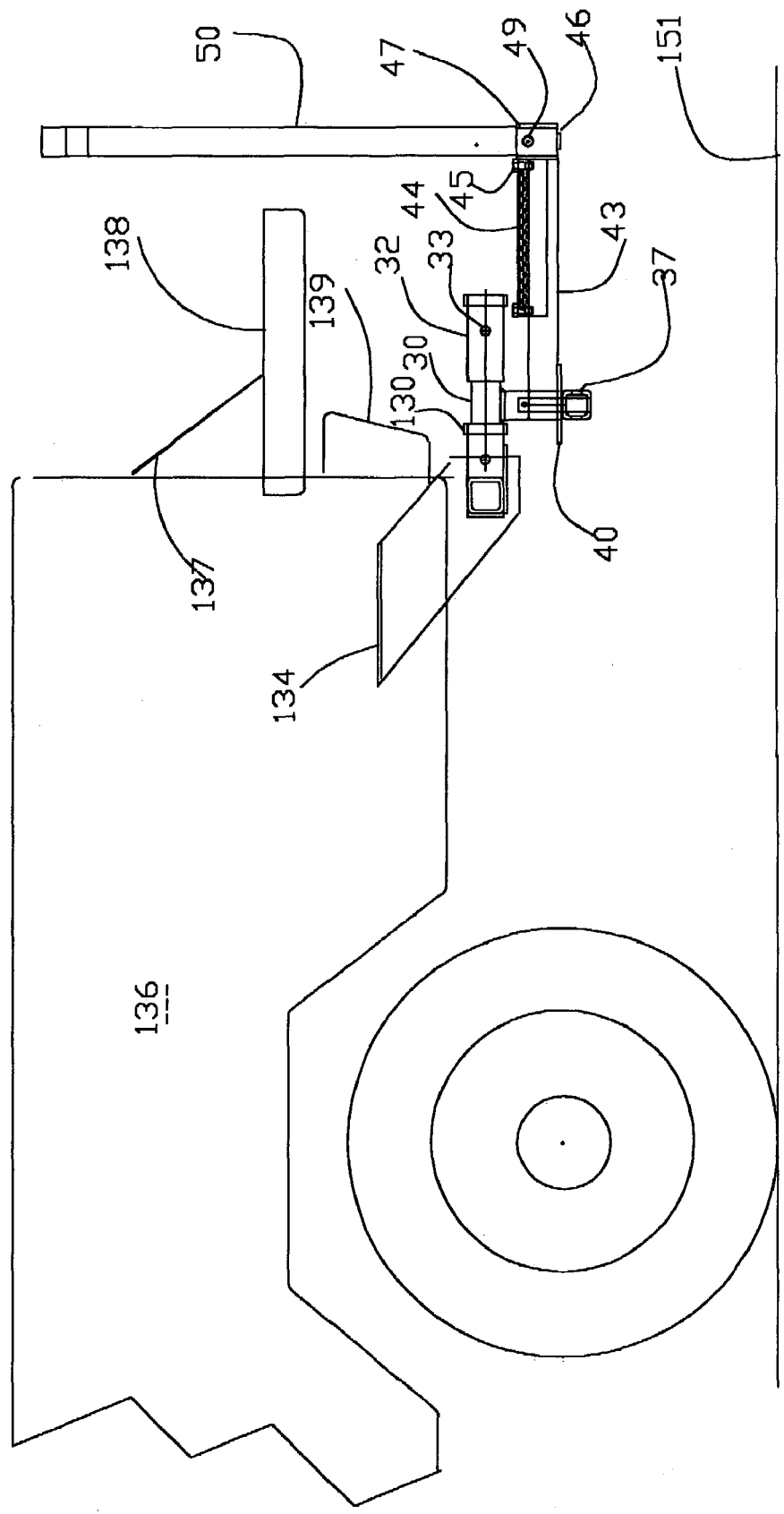
FIG. 2 is a pickup truck side elevation with the rotatable step mounted in the trailer hitch center receiver, and showing the relationship of the step to the lowered tailgate, the ground, and the safety handle installed in it's socket.
Figure 3:
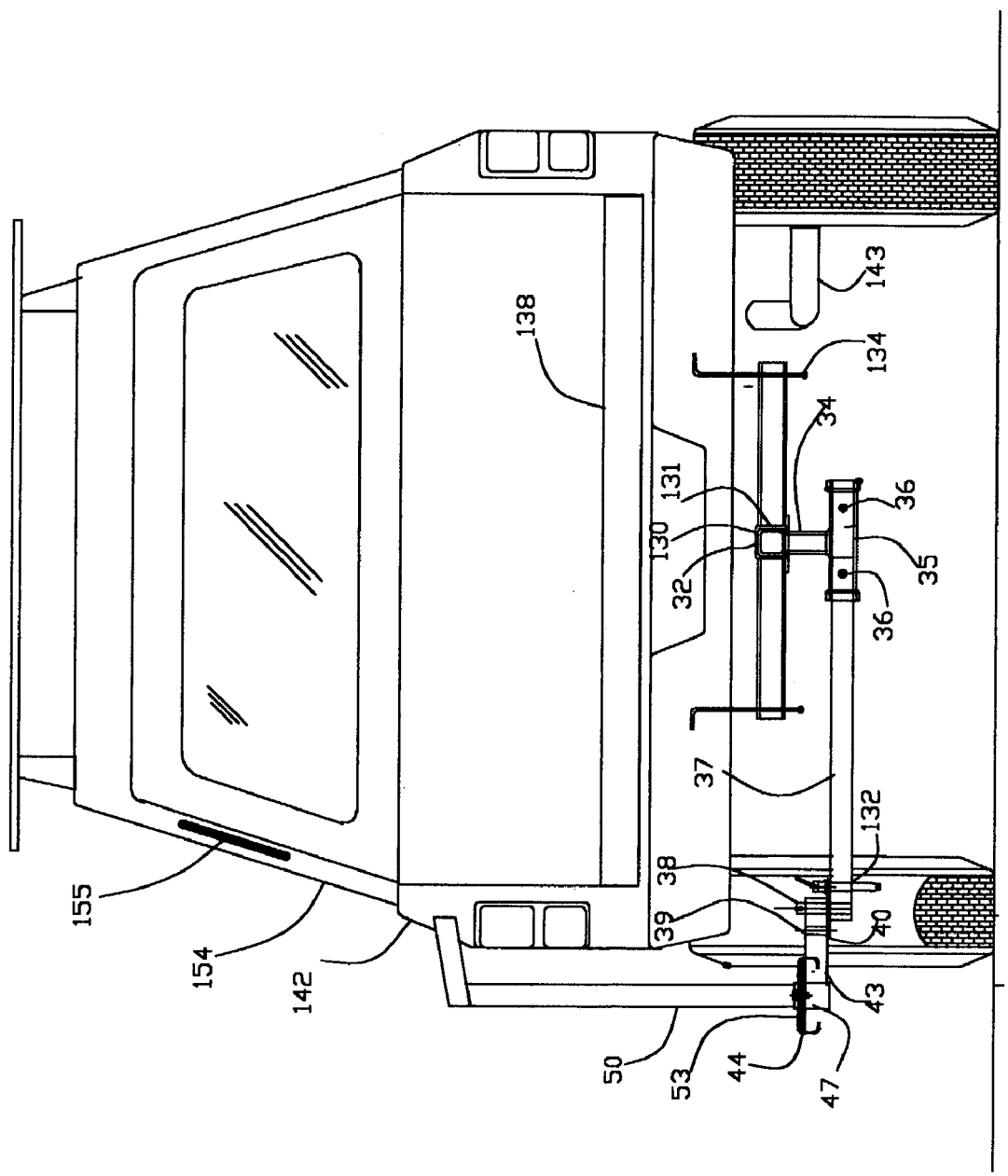
FIG. 3 is a pickup truck rear elevation view with the rotatable step mounted in the trailer hitch center receiver, and showing the relationship of the safety handle, step, lowered tailgate, and ground to one another, and showing the mounting relationship of the trailer hitch to the step components.

Turning next to FIG. 2, there is shown a side elevation of a conventional pickup truck 136 with the tailgate 138 in the down position, supported by the tailgate support cable 137. The vehicle is equipped with a conventional receiver 130, comprising a square tubular sleeve rigidly secured to the underside of the vehicle frame 144 by a commercially available receiver type trailer hitch. This receiver 130 is positioned beneath the vehicle bumper 139 and is located in the center of and faces rearward on the vehicle 136, presenting a rearward opening socket, as shown in FIG. 3. FIG. 3 shows a rear elevation of the pickup truck 140 with the tailgate in the down position.

Figure 5:
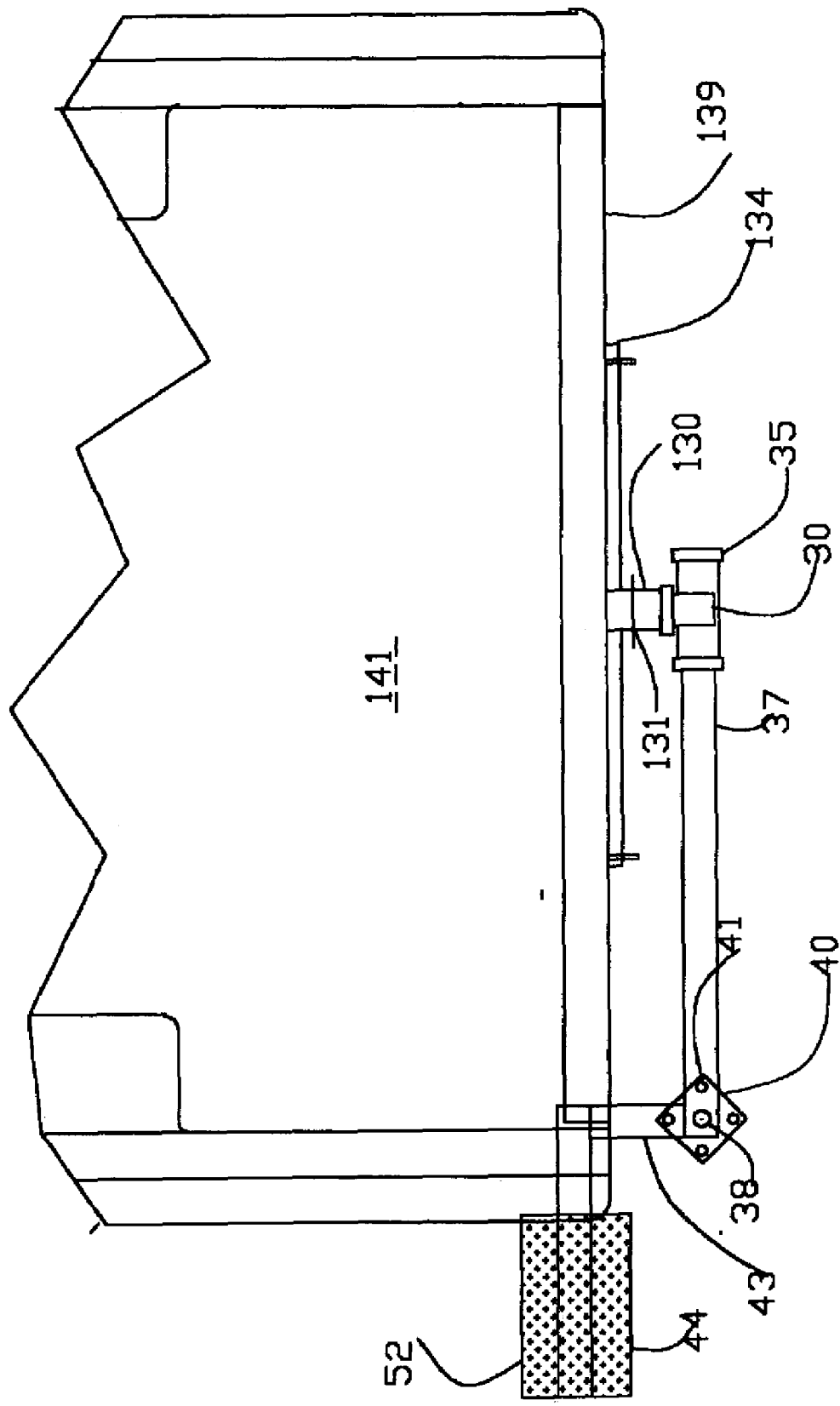
FIG. 5 is a plan view of a pickup truck bed with the rotatable step locked in the roof rack access position, [bumper is omitted for clarity].
Figure 6:
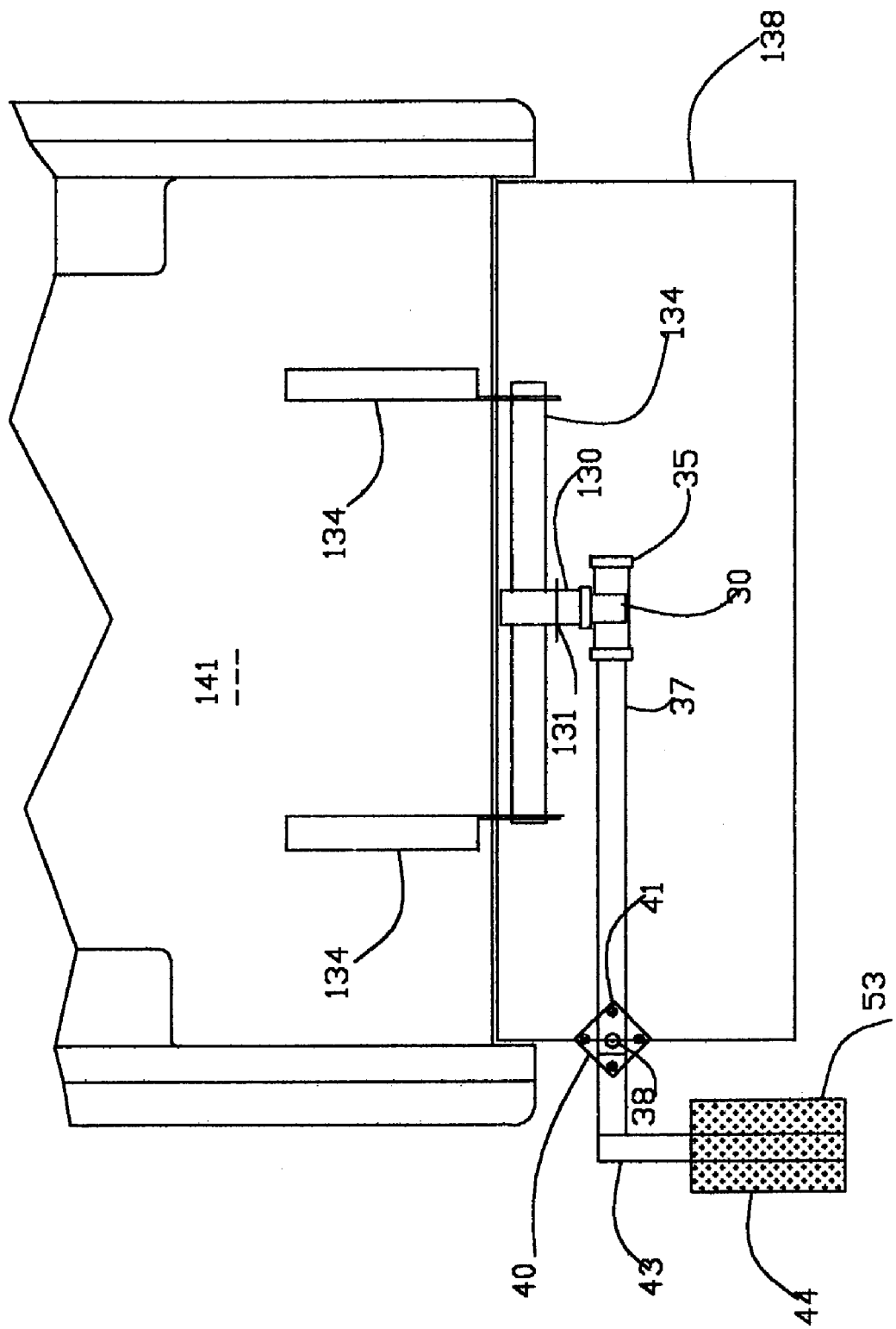
FIG. 6 is a plan view of a pickup truck bed with the pivot step locked in the tailgate down position, [bumper is omitted for clarity].
Figure 7:
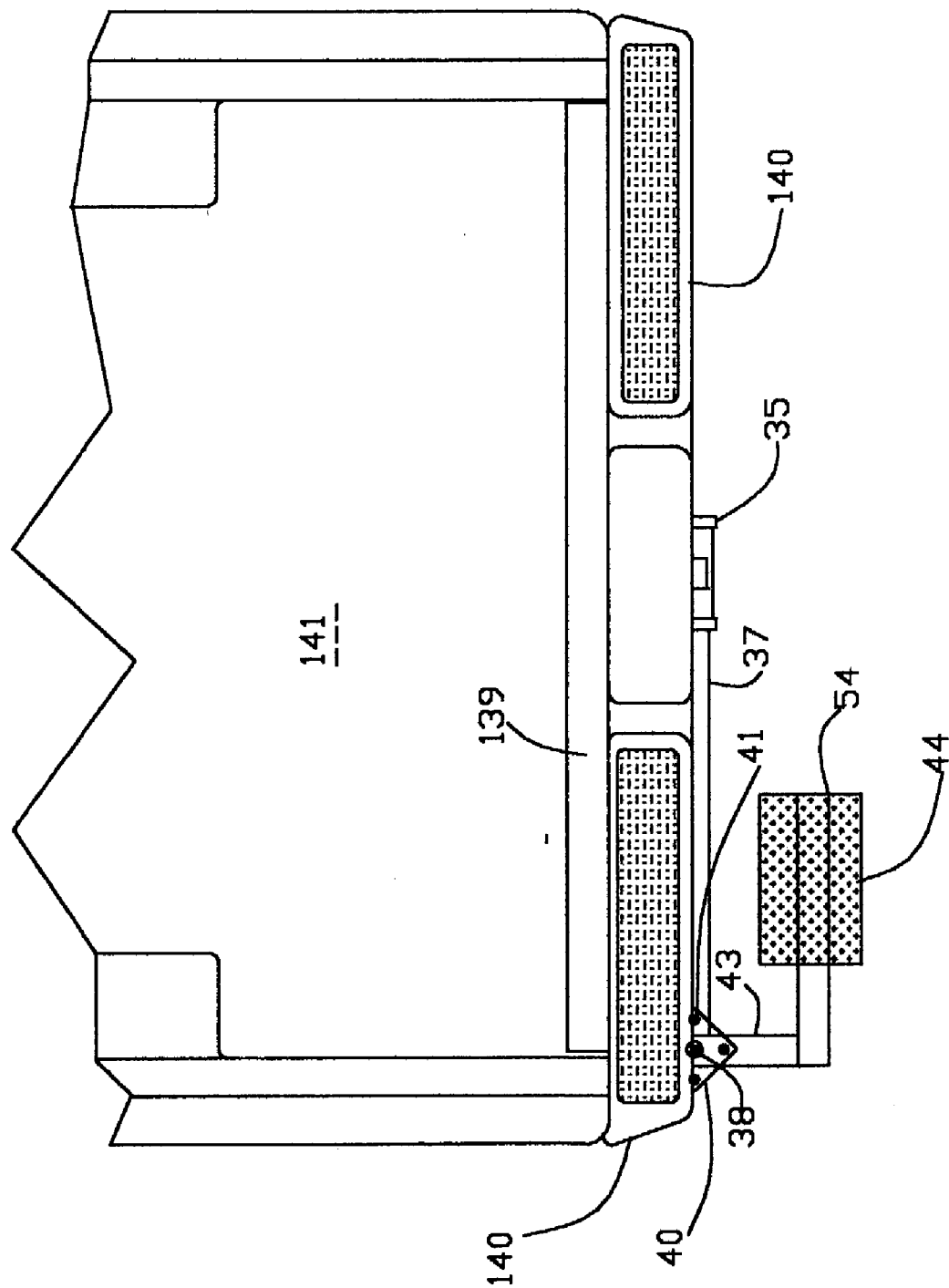
FIG. 7 is a plan view of a pickup truck bed with the pivot step locked in the tailgate up access position [bumper is included in this figure since it would be used with the step to enter the truck with the tailgate up, or if the tailgate was missing].

Traditionally the receiver 130 accepts a ball mount assembly (not shown), to facilitate pulling a trailer or to engage a trailer hitch accessory such as a bicycle carrying rack. According to the present invention, the ball mount assembly is replaced by a rotatable step assembly comprising major subassemblies "accessory receiver", "pivot pin bar", and "step assembly" as detailed above and in FIG. 1. The "accessory receiver" with it's double end receiver 35, and drop or lowering bar 34, may have varying dimensions to suit the height requirement, calling for multiple models of "accessory receiver", as may be found in the standard components software typical printout FIG. 21. To accomplish an important function of the invention, there is shown in FIGS. 1, 2, and 3 a dual receiver 35 having the ability to accept trailer hitch accessories from two directions 180 degrees from one another. This enables devices, such as a "pivot pin bar" 37, to be installed from either the left or the right enabling installation of a pivot step on either side of a vehicle. Personal preferences, location of under truck obstructions such as exhaust pipes 143, or other obstructions may be reasons for installing a swivel step on either the left or the right side of the vehicle. The dual receiver 35 also enables installation of pivot step assemblies parts 40 to 45 on both sides of the vehicle at the same time, obstructions permitting. The center receiver extension 32 is fastened to the center receiver extension bar 30 with suitable fastening devices to prevent movement between the two members. The center receiver extension 32 thus may be used for any of the ball mounts, or other trailer hitch accessory devices available. Dimensional changes to this double end receiver with the drop feature, enabled by substituting another standard part from the software represented in FIG. 21 to accomplish the desired height. These changes do not alter the intent of the present invention, and double end receivers with different support configurations may be offered as standard components as in FIG. 21 by the company in several different sizes. Referring again to FIGS. 2 & 3 the double end receiver assembly, parts 30 to 36 are attached to the center receiver 130, shown best in FIG. 2, and presents left and right accessory openings, FIG. 3. A pivot pin extension bar 37 is also shown secured in the left hand side of the double end receiver 35, using a standard hitch pin and clip. At the opposite end of the bar 37 is located a vertical pivot pin 38 and FOUR holes 41 into which a step locking pin 132 is inserted, locking the pivot step in any one of the several working positions FIGS. 5, 6, and 7, or the stowage position FIG. 4. FIGS. 2 and 3 also show the pivot step assembly, 40 to 45 locked in the truck tailgate down step access position 53, giving access to the side of the tailgate where additional assistance can be gained by installing a handle 155 on the truck cap 154. It will be noted that the step tread 44 is approximately one half the distance from the ground level 151 to the tailgate 138, and is positioned outside of the vertical shadow of the tailgate, permitting easy stepping access to the tailgate. This access is achieved by using an important feature of this patent, the geometry or positioning of the tread 44 which is achieved by the rotatable L shaped support bar 43 being pivoted around the pivot pin 38.

Figure 4:
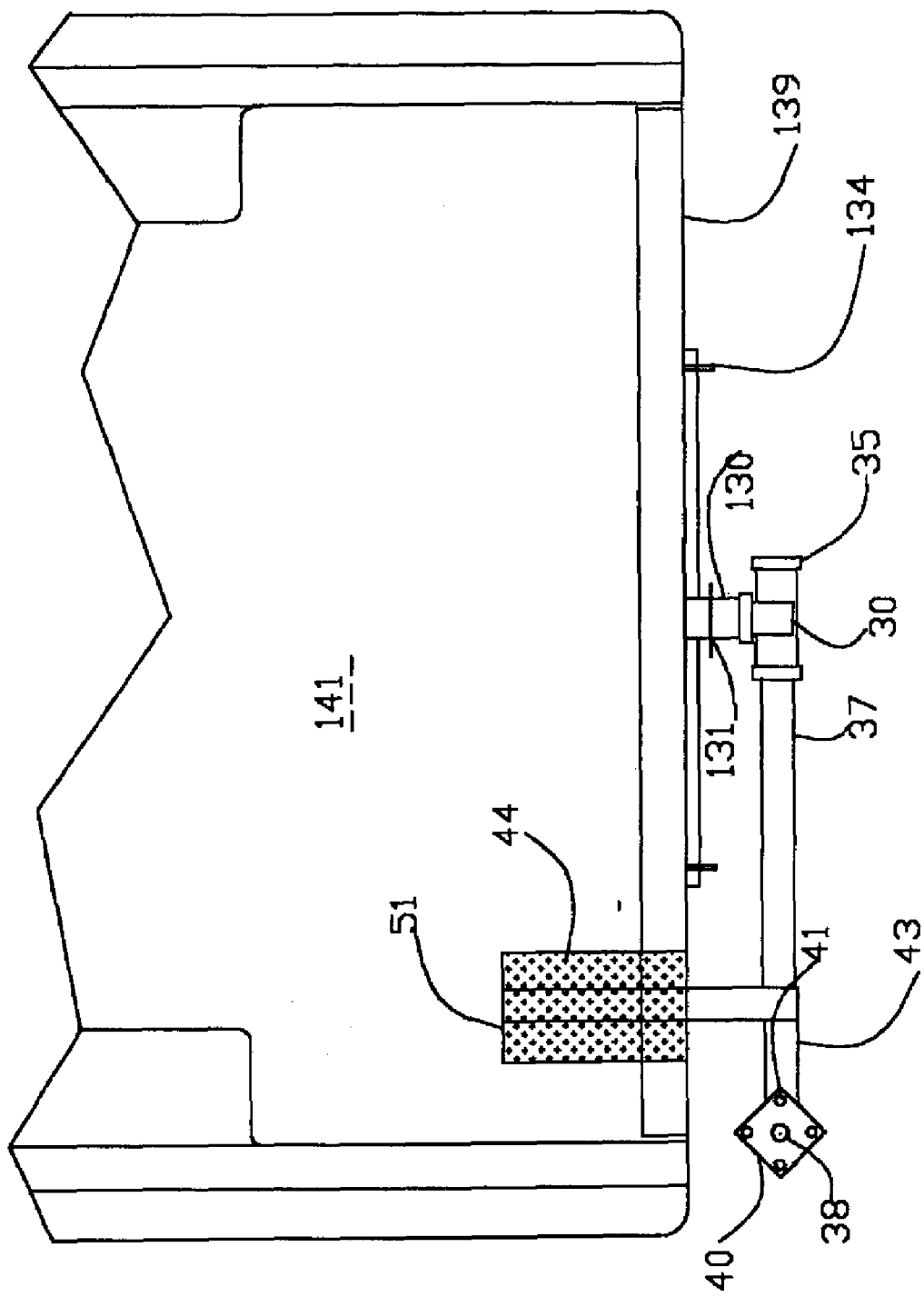
FIG. 4 is a plan view of a pickup truck with the rotatable step locked in the stowage position under the truck, [with the bumper omitted for clarity].

Under truck stowage is shown as position 51, in FIG. 4, giving out of the way stowage of the "step assembly" for vehicle travel. Position 52, FIG. 5, achieved by rotating the step 90 degrees counterclockwise around the pivot pin 38 from the stowage position 51 gives better access to items on an elevated roof rack, which may be mounted on a pickup bed cap. Position 52 also gives better access to items in the truck bed when a cap is not in use. A further counter clockwise rotation of 90 degrees around the pivot pin 38, puts the step in position 53, FIG. 6, the truck tailgate down step access position. The last working position 54, FIG. 7, truck tailgate up step access position is achieved by a similar 90 degree counter clockwise movement from the position 53, around the pivot pin 38. Reversing the direction of rotation to clockwise movement, around the pivot pin 38, can take the step from position 54 to 53 then to 52 and finally back to the stowage position 51, for vehicle travel. Each of the four positions has a specific locking hole 41 in the locking plate 40, which is secured to the L shaped support bar 43, and the locking pin 132 is removed to effect a new position and then replaced in the new set of holes 41 and 39. Further provision is made for installation of a rotatable step on the right hand side of the vehicle through use of the right hand accessory entry of the dual receiver shown in FIG. 3, or any other receiver mounted accessory, with appropriate connection bars. All components used for the left hand installation are used in reverse for the right hand installation, for example the dogleg support bar 33 has means to secure the step tread 31 for either left or right hand use. Obviously there could be more or less working locations by increasing or decreasing the number and location of locking holes 41 in the indexing plate 40, giving different positions for the step 44. With this invention, the rotatable step can be used on many different vehicles or on machinery requiring access to elevated positions and having requirements for multiple working positions.

To further enhance the safety of the rotatable step my invention discloses on FIGS. 1, 2, and 3, a safety handle bar 50 mounted in a safety handle bar receiver 47 and secured by a standard hitch pin 132 inserted in 49, the safety handle bar securing pin hole. The safety handle bar receiver 47 is welded or substantially fastened to the swivel step L shaped support bar 43, and presents a vertical upward opening socket at the end of the L shaped support bar 43. As the safety handle bar 50 is inserted into the safety handle bar receiver 47, a means of restricting the downward travel is provided to help align the hitch pin 132 in the safety handle bar securing pin holes 49. This safety handle bar 50 provides a substantial means of pulling oneself up to the rotatable step 44 using the strength of the arm and upper body, and then gives further aid in ascending to the tailgate itself 138. Additionally the safety handle bar 50 serves as a guide for the foot when descending from the tailgate 138 to the swivel step 44, by placing the side of the foot against the handle bar 50 and sliding the foot downward until the step tread 44 is engaged. This prevents overstepping the step tread 44. To use position 51, the stowage position, the safety handle bar 50 must be disengaged from the safety handle bar receiver 47, before rotation of the pivot step to the under truck position 51 can be attained. The safety handle bar assembly is adaptable to all rotatable step installations, left or right hand, and with all of the foreseeable structural supporting systems.

Figure 13:
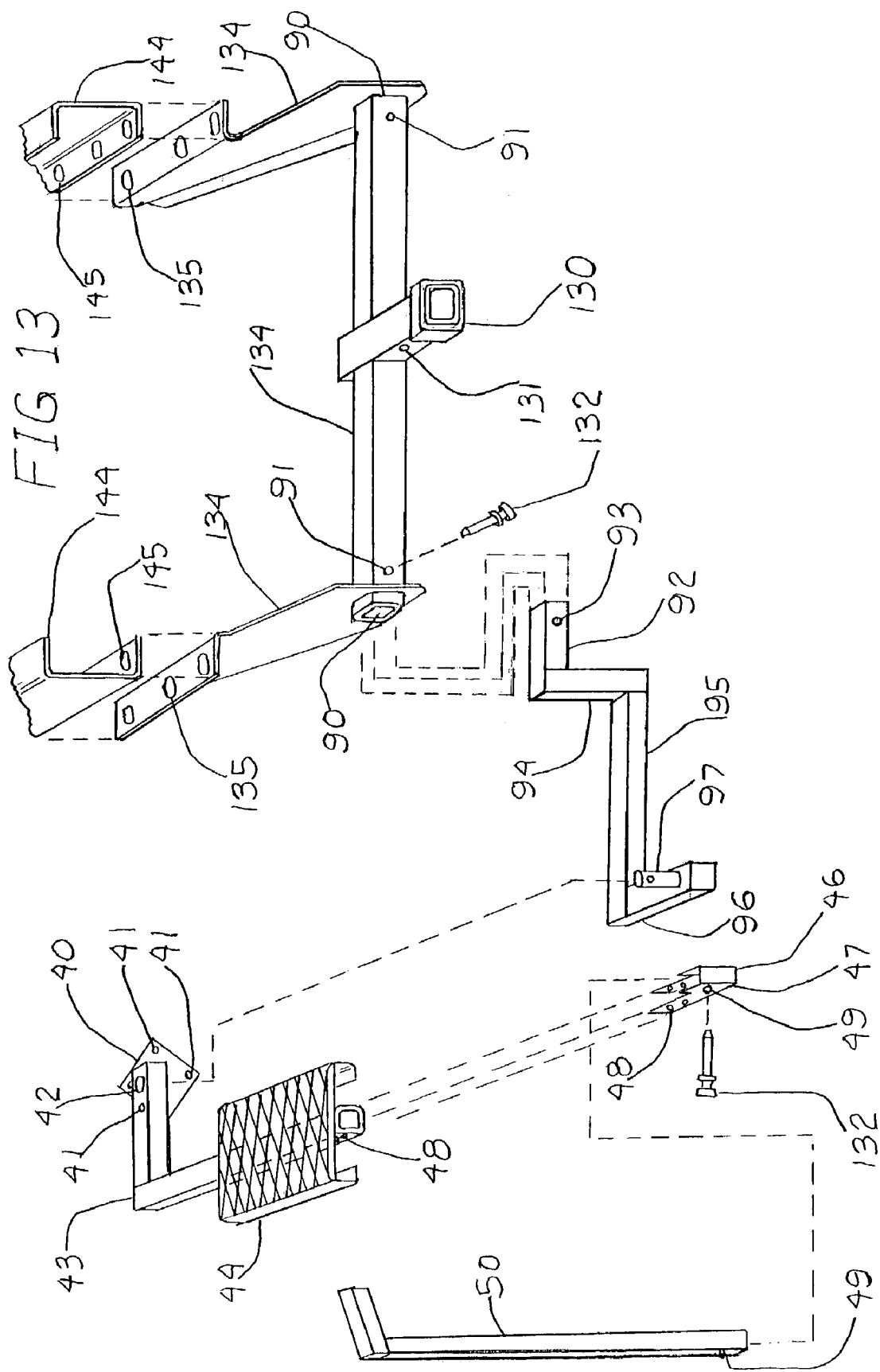
FIG. 13 is an isometric drawing of a commercially available trailer hitch adapted to have the extreme ends of the horizontal support tube become side entered accessory receivers, with components required to become a rotatable step assembly, and appropriate assembly directions.
Figure 14:
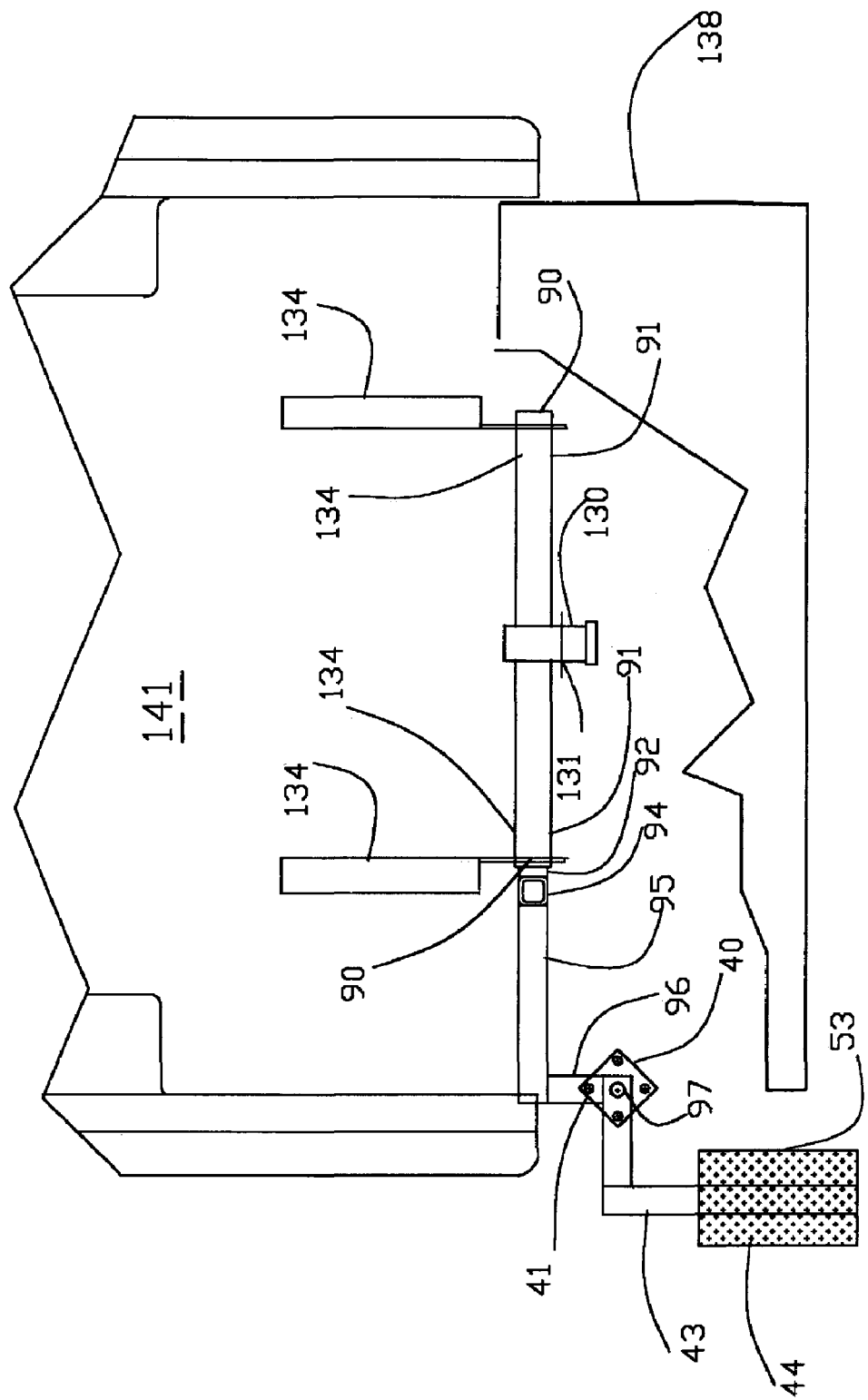
FIG. 14 is a pickup truck plan view with a commercially available trailer hitch refitted to have the extreme ends of the horizontal support tube become side entered accessory receivers,with the pivot pin subassembly and the step subassembly positioned on the truck as they would be used. The tailgate is partly removed as well as the truck bumper being completely removed to clarify the drawing.

An alternate means of providing the structural support for the swivel step, instead of using the center mounted receiver of a conventional trailer hitch, is shown in FIGS. 13 and 14, end mounted rotatable step drawings. According to my invention, using either the right or left hand end of the open horizontal tubular socket 90 of the conventional receiver type trailer hitch 134, a structural supporting receiver is created by clearing any internal obstructions in the central support tube 98, right or left, and providing a hitch pin hole 91 at either or both ends of tube 98. Thus a dual receiver is created out of a conventional trailer hitch 134, leaving the center receiver 130 available for use in pulling a trailer or in mounting any of the available trailer hitch accessories. The same pivot step assembly comprised of components 40, 41, 42, 43, 44, and 45 can be used with this end mounting assembly. To duplicate the position of the pivot pin 38, shown in FIG. 6, a new pivot pin assembly calling for components 92, 93, 94, 95, 96, and pivot pin 97 are required, as shown in FIGS. 13 and 14, mounted into either of the openings 90, or both.

Figure 12:
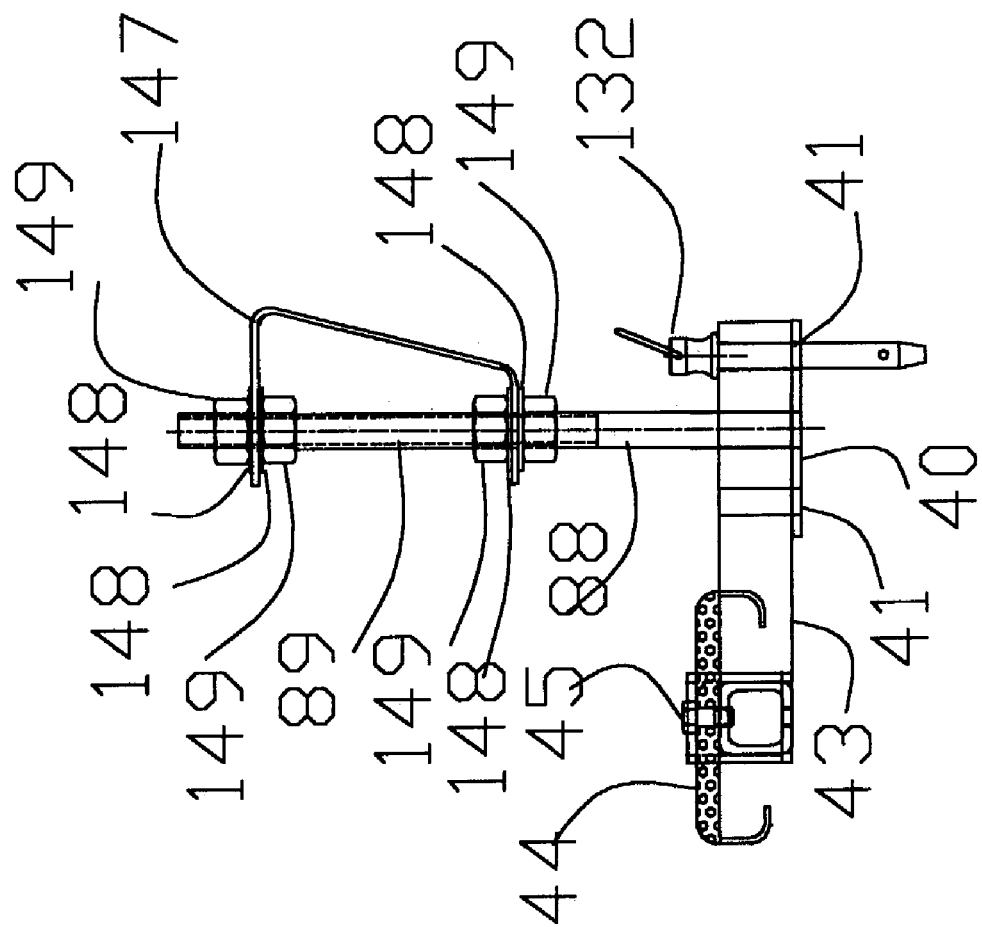
FIG. 12 is a drawing of a vehicle bumper cross section adapted to accept a partly threaded pivot pin on which is installed a step assembly, used in common with other embodiments of this invention.

The present invention is also concerned with mounting the pivot step assembly 40 to 45, directly beneath the conventional bumper 147, supplied with the vehicle as standard equipment, [FIG. 12]. FIG. 12 shows a cutaway view of a typical conventional bumper 147 with one possible structural support system 88, 89, and commercially available components 148 and 149, for mounting the rotatable step with parts 40 to 45 and hitch pin and clip 132. This embodiment has a round bar, the upper portion of which is threaded 89, while the lower portion 88 is left unthreaded and serves as a pivot pin for the L shaped support bar 43 and step tread 44 as used in previously detailed assemblies of the rotatable step, FIGS. 1, 2, and 3. This version of the rotatable step installation rotates through the four locked positions 51, 52, 53, and 54 and has a stowage position under the truck 51 for vehicle travel. Similar locking principles are used to lock the swivel step assembly, 40 to 45 into one of the working or stowage positions, by rigidly attaching 40, the locking plate, to the bottom of the circular support member 89 and pivot pin 88, and locking the step by inserting the step locking pin 132 into one of the pivot locking pin holes 41, similar to that shown in FIG. 1. Installation of this pivot pin assembly may require drilling two holes in the horizontal portions of the bumper, for the pivot pin to pass through and to be locked in place.

Figure 15:
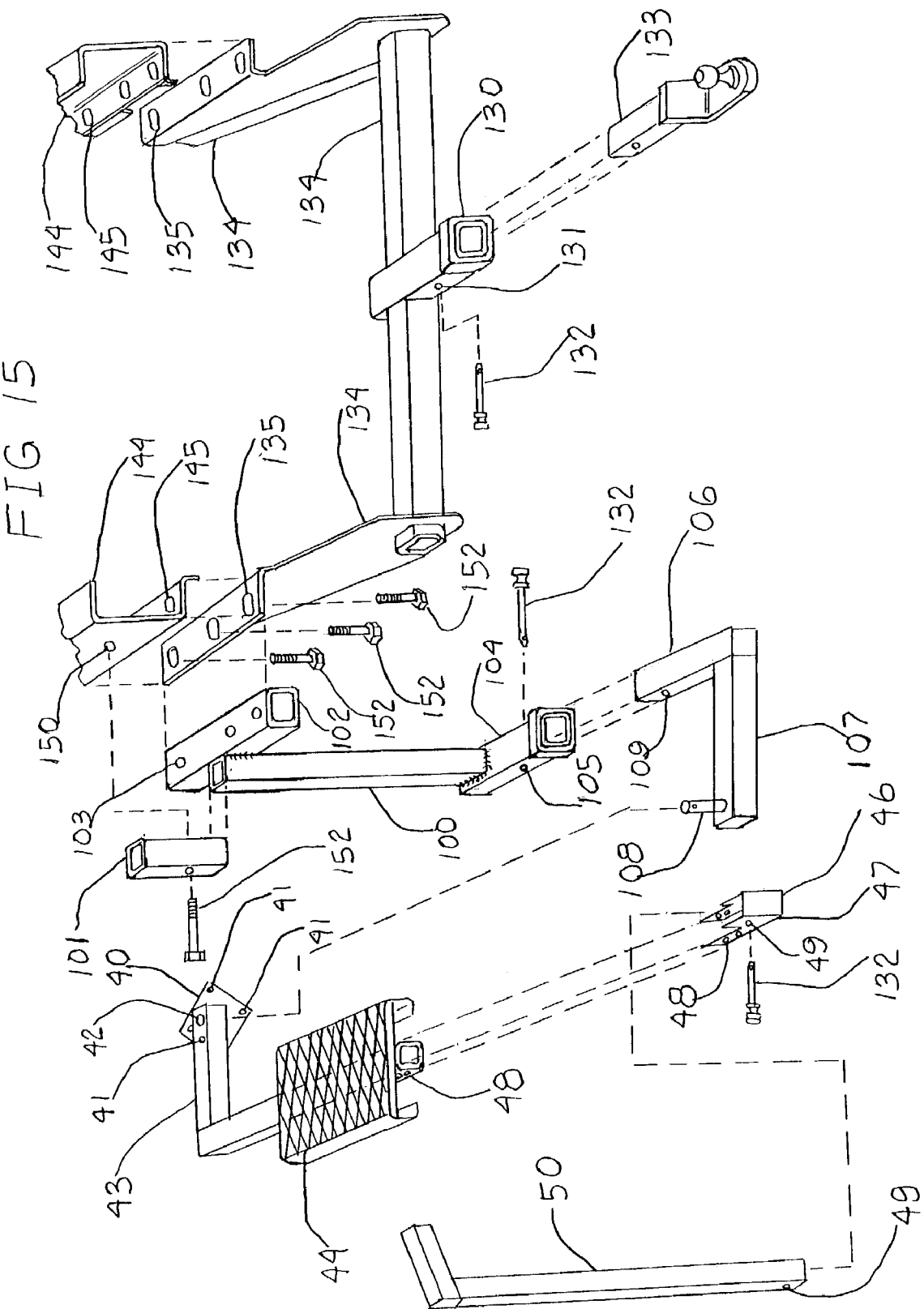
FIG. 15 is an isometric drawing showing a frame mounted rotatable step with a commercially available trailer hitch installed,both using the same truck frame mounting holes.

Pursuant to the present invention, provision is made for a structural support system of the swivel step assembly, parts 40 to 45, to be bolted directly to the frame of the vehicle. To this end FIG. 15 shows a frame mounted support assembly comprised of components 100, 101, 102 103, 104 and 105 with component 104 being the rearward open receiver. Component 101 is a vertical extension of part 100, which was offset for drawing clarity. This frame mounted support assembly, 100 to 105, is bolted to the vehicle frame 144 in at least three places along with the trailer hitch 134 using common mounting holes 102, 135 and 145 provided in the truck frame. These holes 145, normally provided by the vehicle manufacturer may be used with or without a trailer hitch assembly 134. A L shaped pivot pin mounting bar having parts 106, 107, 108, and mounting hole 109 is secured in the receiver 104 using a standard hitch pin and safety pin 132, inserted in holes 105 and 109 This mounting bar 106 to 109 has at its distal end, the pivot pin 108 rigidly fixed to the mounting bar. Onto this pivot pin 108 the swivel step assembly parts 40 to 45 of FIGS. 15 and 1 can be assembled to make a functioning rotatable step. Full operational features as shown in FIG. 1, and described above are now in place for the frame mounted rotatable step. A mirror image of the frame mounted support assembly with components 100 to 105 and with the L shaped pivot pin assembly 106 to 109 may be attached to the right frame of the vehicle 144, using similar mounting holes 145. Thus a swivel step or other accessories requiring a rotatable feature may also be mounted on the right hand side of the vehicle. Another unique advantage this frame mounted support assembly with parts 100, 101, 102, 103, 104 and 105 gives is the possible installation of two frame mounted receivers mounted equidistant from the center receiver 130 and at the same or a different elevation from the center receiver 130. This enables attachment of auxiliary accessories requiring two accessory receivers 104 requiring additional support and stability, not provided by a single receiver 130. Examples of auxiliary accessories requiring this additional stability are devices which would carry a motorcycle, or a job box for tools. It is also possible that these accessory receivers 104 could be equipped with vices, work tables or other tradesman type appliances.

Figure 16:
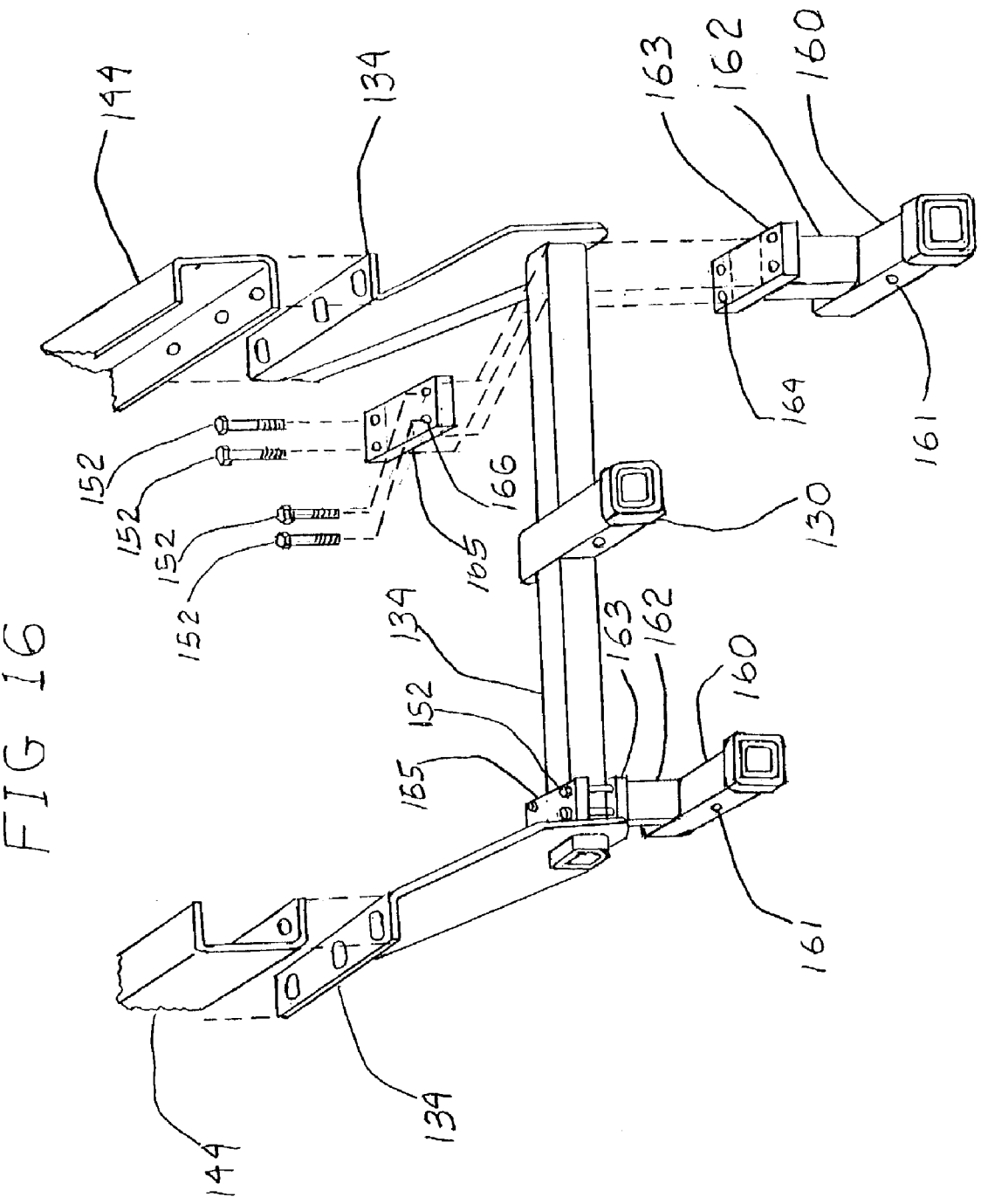
FIG. 16 is an isometric drawing showing a clamp on accessory receiver attached to a commercially available trailer hitch, giving two auxiliary accessory receivers.

FIG. 16 shows another unique way of securing a three receiver hitch, with a pair of clamp on accessory receivers being fastened to the commercially available trailer hitch 134. The receiver type trailer hitch 134 is fastened to the truck frame 144 and may not have to be removed for this installation. An accessory receiver 160 with a hitch pin securing hole 161 also has a vertical member 162 which positions the accessory receiver on a slightly lower horizontal plane from the center receiver, giving more user flexibility. To complete this assembly, a plate 163 with four tapped holes or the like 164, is fastened to the vertical member 162. This subassembly of parts 160 to 164 is placed on the bottom flat side of the horizontal supporting member of the trailer hitch and held securely in place by four bolts 152 going through the four holes 166 in the upper plate 165 and screwing into the four holes 164 in the lower plate 163. This fastening arrangement gives flexibility in the positioning of the clamp on accessory receivers, left and right on the trailer hitch support tube. Since this is an add on to a device that has a weight limiting restriction, the accessory receivers must comply with these limitations. The left hand side of the trailer hitch shows the clamp on accessory receiver bolted in place, and ready for use.

Figure 17:
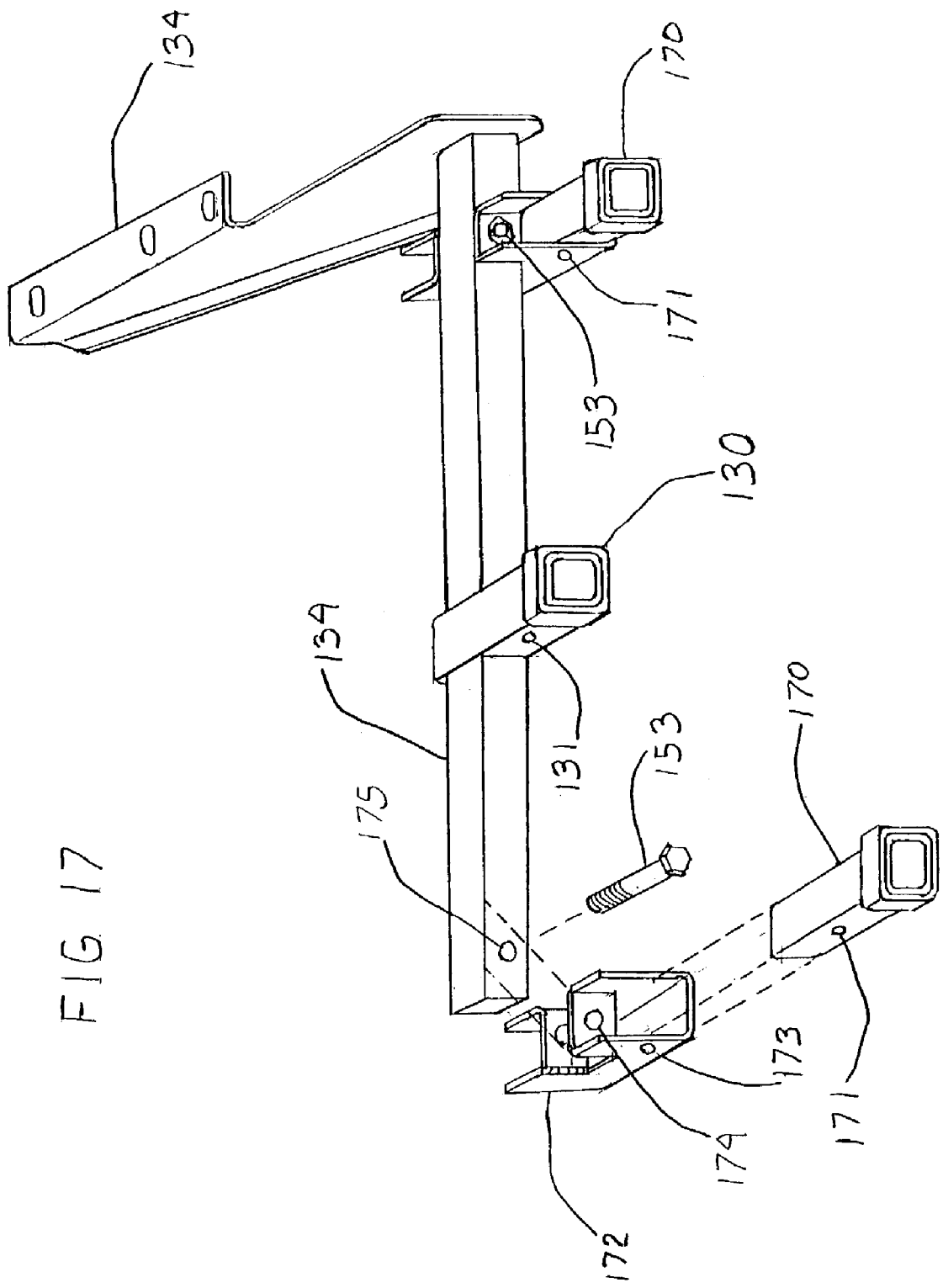
FIG. 17 is an isometric drawing showing an accessory receiver saddle which may be attached by bolting or welding or the like, requiring original hitch manufacturers adaptation.

FIG. 17 again shows an arrangement for adding accessory receivers to a conventional center receiver type trailer hitch 134. The present embodiment provides a saddle 172, which holds the accessory receiver 170 securely in place, and is bolted 153 through holes 174 and 175, or welded, or the like, to the horizontal supporting tube of the trailer hitch 134. In operation, holes 171 in the receiver tube and holes 173 of the saddle are aligned so a hitch pin may be inserted, to hold an accessory device in place. The right hand side of the trailer hitch shows the accessory receiver in place and ready for use. Again weight restrictions for the original trailer hitch are required to be observed.

Figure 11:
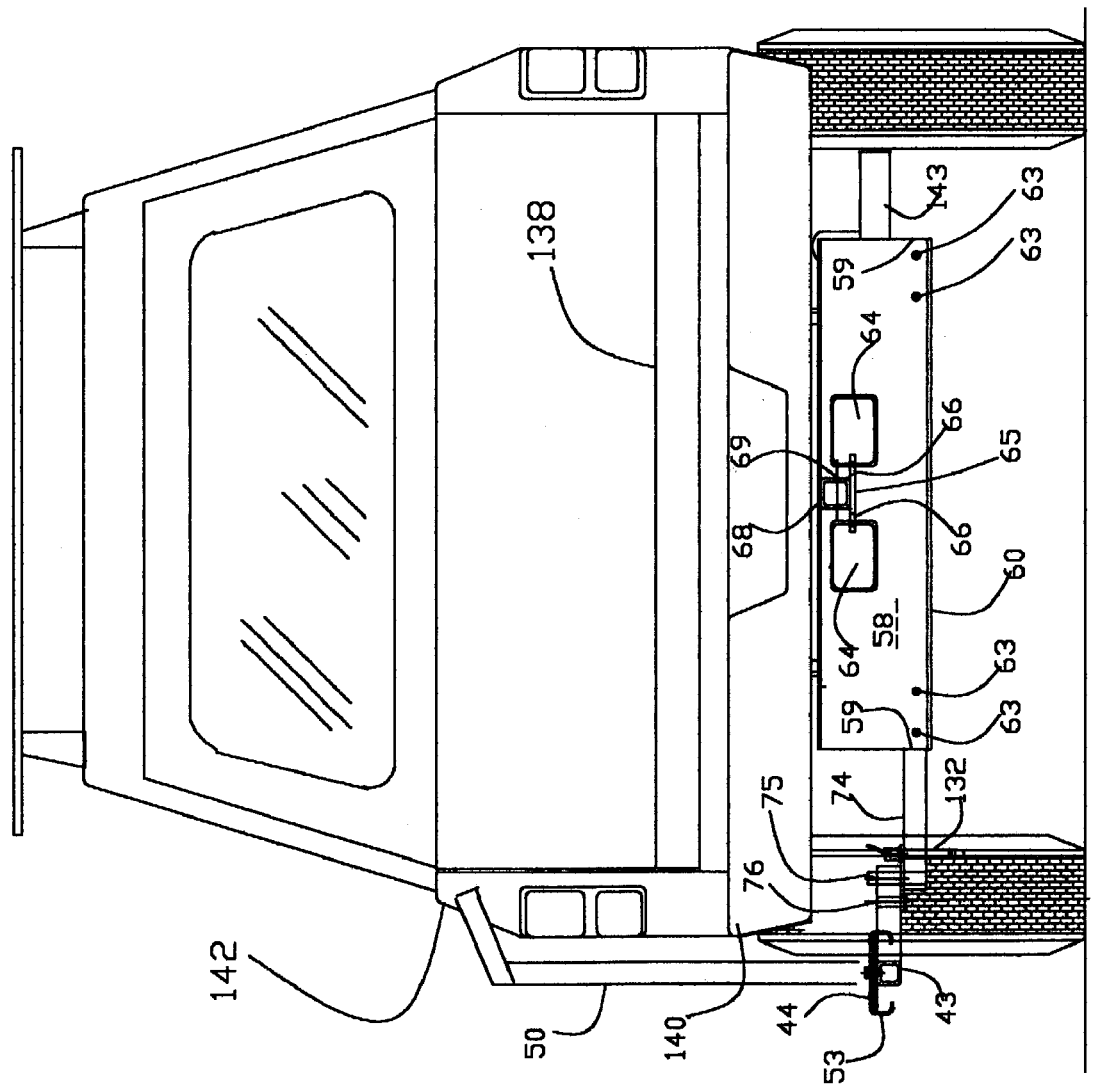
FIG. 11 is a rear elevation of a pickup truck with a mini bumper and rotatable step installed in the side accessed receiver, built into the mini bumper. Take note of how the vehicle exhaust pipe [right hand side] may restrict the stowage position of the rotatable step.

FIG. 11 shows another novel way of mounting the rotatable step to a vehicle, namely a mini bumper 58. The "accessory receivers" 59 are formed as an integral part of the mini bumper shell, 60 and are entered from the side or end of the bumper, as shown on FIG. 9. Parts numbering 58 to 69 make up the mini bumper itself, while the mini bumper frame attachment members 70, 71, 72, and 73, are shown best in FIG. 8. Holes 145 in the truck frame 144 are matched with holes 73 in the frame connectors 70 [right] and 71 [left] with bolts and nuts, or the like. Further assembly requires aligning four holes 72 on each frame connector 70 and 71, with four holes 62 on each of the two shell stiffeners 61.

Figure 9:
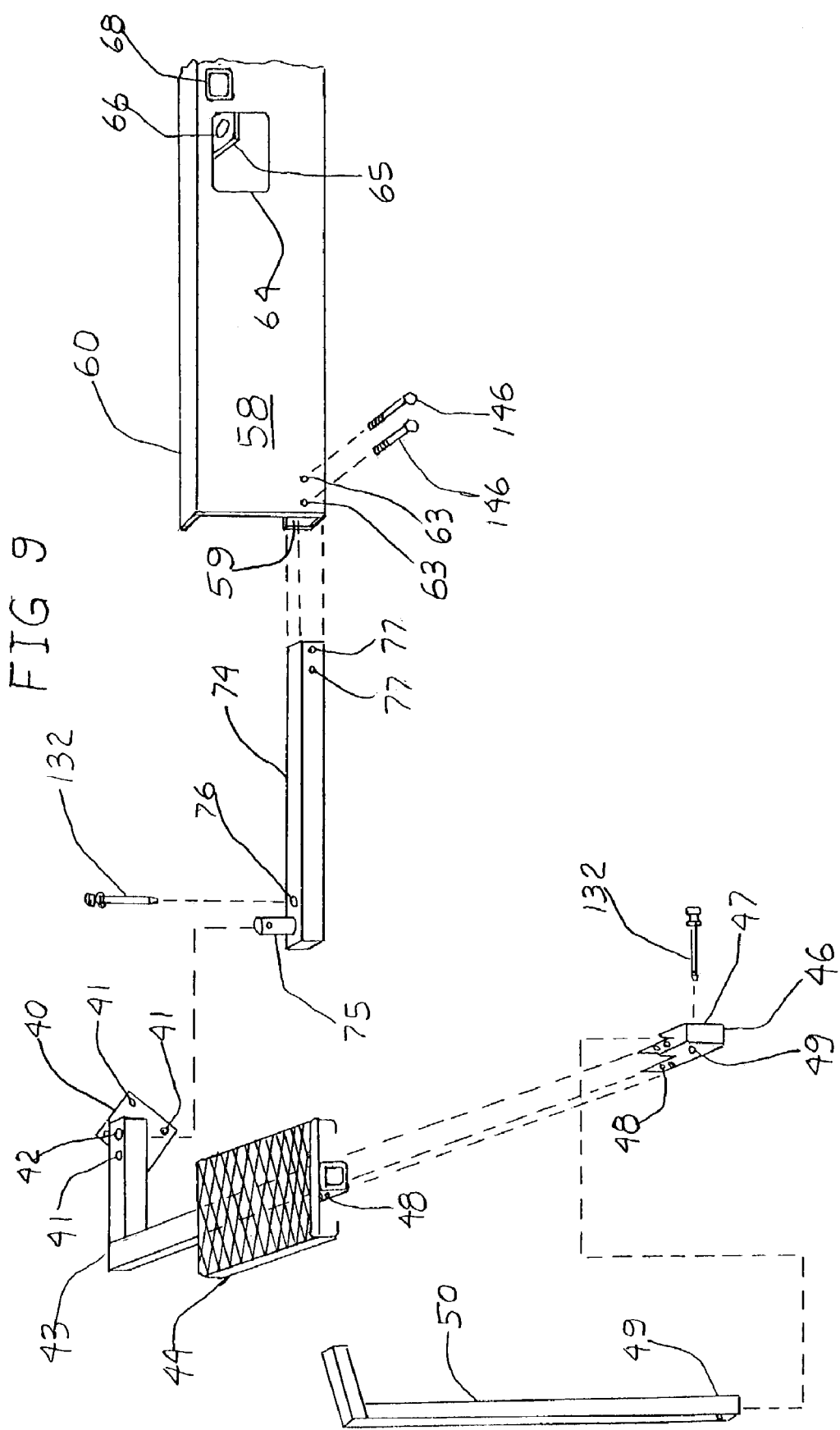
FIG. 9 is an isometric partial view of a mini bumper with a rotatable step and optional safety handle and their relationship to one another.
Figure 10:
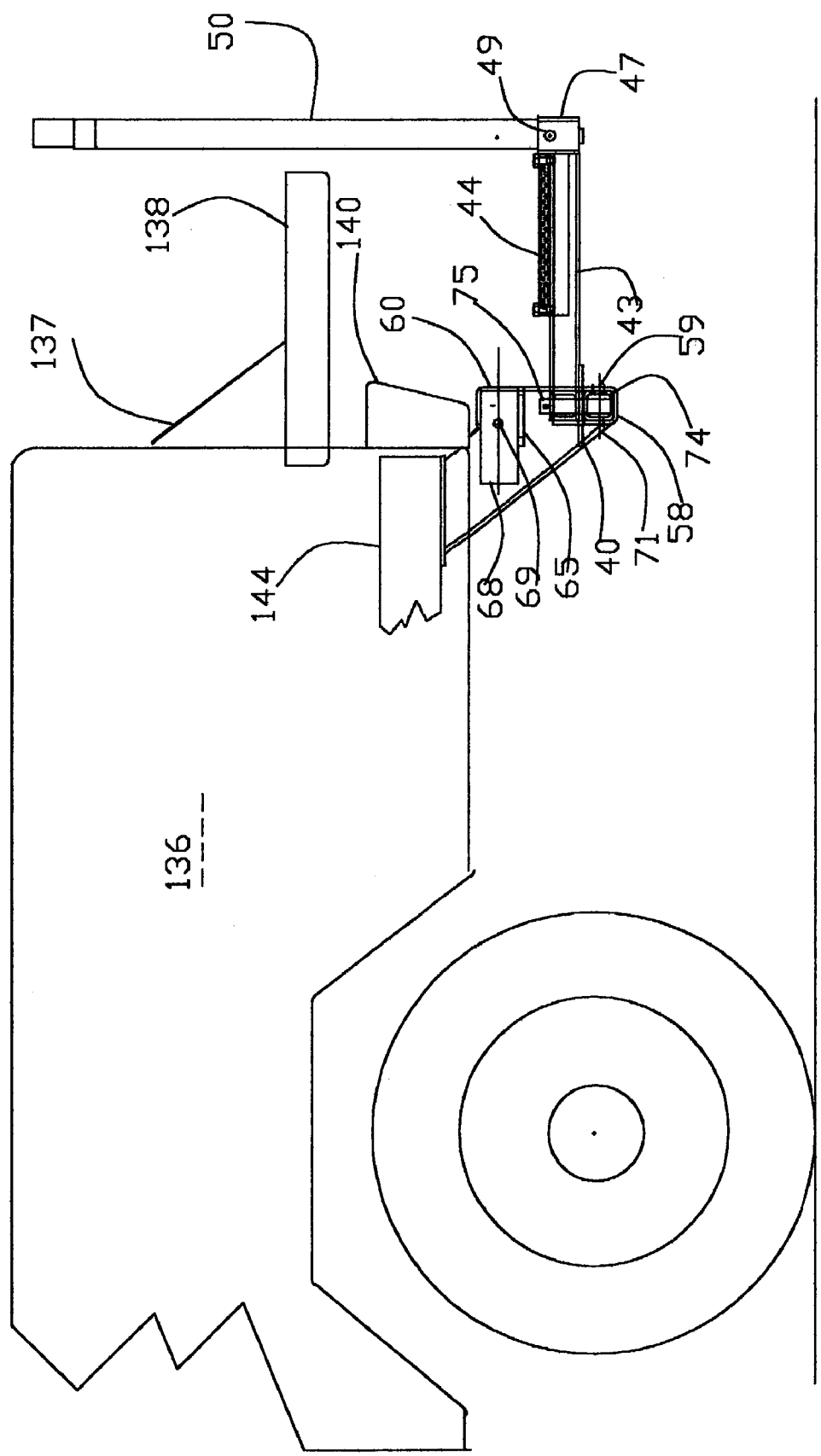
FIG. 10 is a side elevation of a pickup truck with the tailgate down and the mini bumper with a side mounted rotatable step serving the tailgate in the down position.

Next a "pivot pin bar", FIG. 9, having parts numbered 74, 75, 76, 77, are inserted into the mini bumper receiver 59 and two fastening devices, 146 pass through holes 63 in the shell 60, and holes 77 in the pivot pin bar 74 making a secure connection. As in previous embodiments of this invention, the standard "step assembly" having parts 40 to 44, and safety handle optional add on, numbers 46 to 50 are assembled by inserting pivot pin 75 of the "pivot pin bar" 74, into hole 42 of the "step assembly". A standard hitch pin and clip 132 complete the assembly by being inserted into one of the four indexing holes 41 and the index locking hole 76 located on the pivot pin bar 74. If desired, a safety handle can be added at any time by the customer. As in previously described embodiments of this invention, the "step assembly" assembled on the mini bumper can be rotated and locked into all four working and stowage positions.

Figure 8:
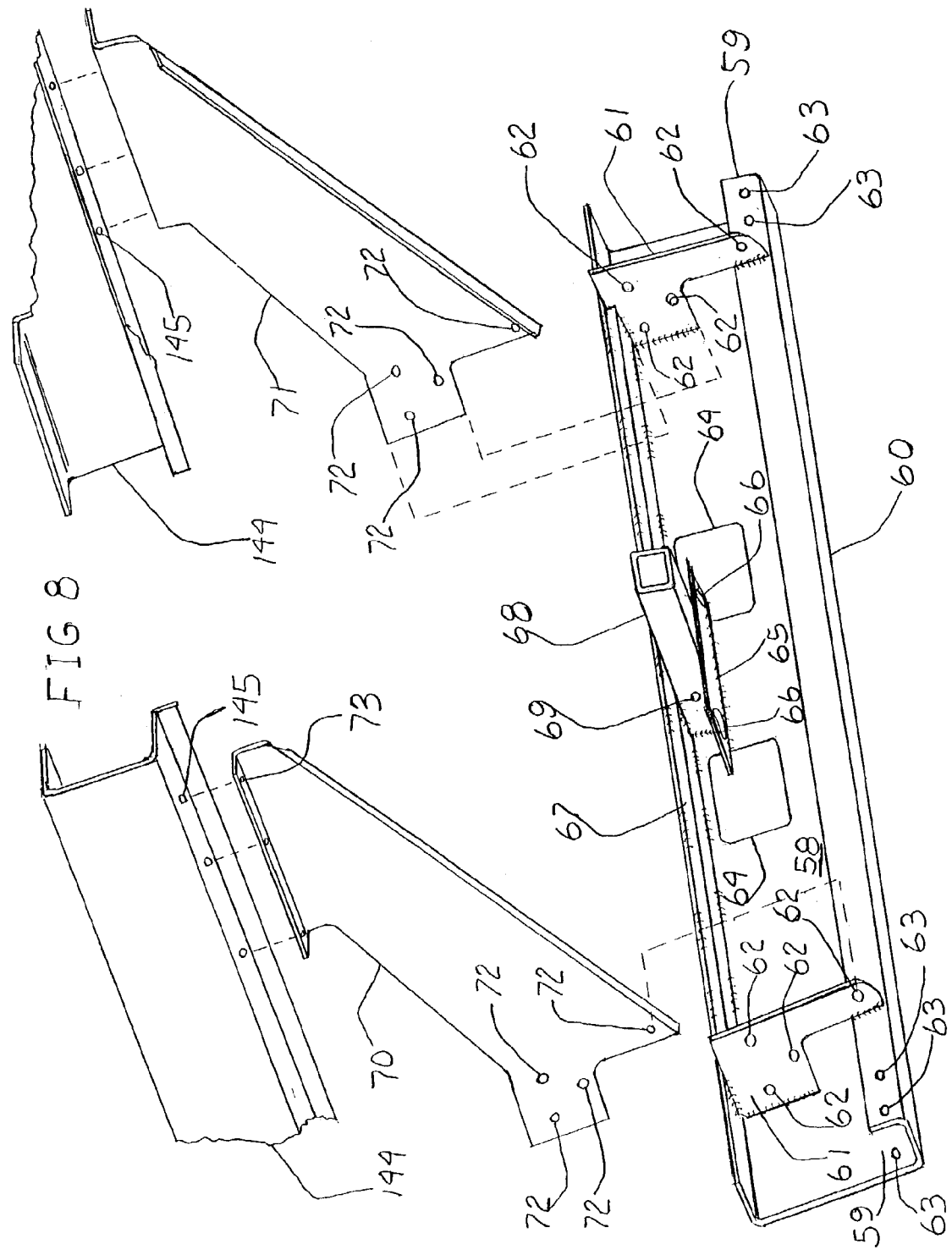
FIG. 8 is an isometric rear view of a mini bumper with brackets shown being attached to the mini bumper and the truck frame.

The fabrication details of the mini bumper are shown in FIG. 8 with an isometric view from the rear and under the mini bumper. The main body or shell 60 of the mini bumper is formed as a "C" or channel with the bottom leg turned up 90 degrees to form a three sided receptacle 59 into which accessories such as a pivot pin bar 74 may be inserted. Further a hole is formed, centered left to right, and at the top of the face of the mini bumper 58, into which a tubular center receiver 68 can be flush mounted with the face of the mini bumper shell 60. The two shell stiffeners 61, in this embodiment are welded at 90 degrees to the back of the face of the shell and in alignment with the two frame connectors 70 and 71. A further stiffener, 67 is secured to and becomes an integral part of the top edge of the mini bumper shell 60, and is welded in this embodiment, to the shell stiffeners 61 as well as the shell itself to provide a substantial support for the center receiver 68, which is also welded to member 67.and to the shell 60. Beneath the receiver is positioned the safety chain plate 65 with two holes 66, to receive the safety chain fasteners. Holes 64 on either side of the center receiver 68, in the face of the shell 60 are to provide access to the hitch pin hole 69 and to allow the safety chain to be fastened to the holes 66. It should be noted that the face of the mini bumper is free of any obstructions, such as receivers or safety chain plate.

The mini bumper is designed to match the bumper height of automobiles and to create a less dangerous and costly collision, should one occur. The mini bumper can with it's center receiver and two side accessory receivers, become the next generation of trailer hitches.

Figure 18:
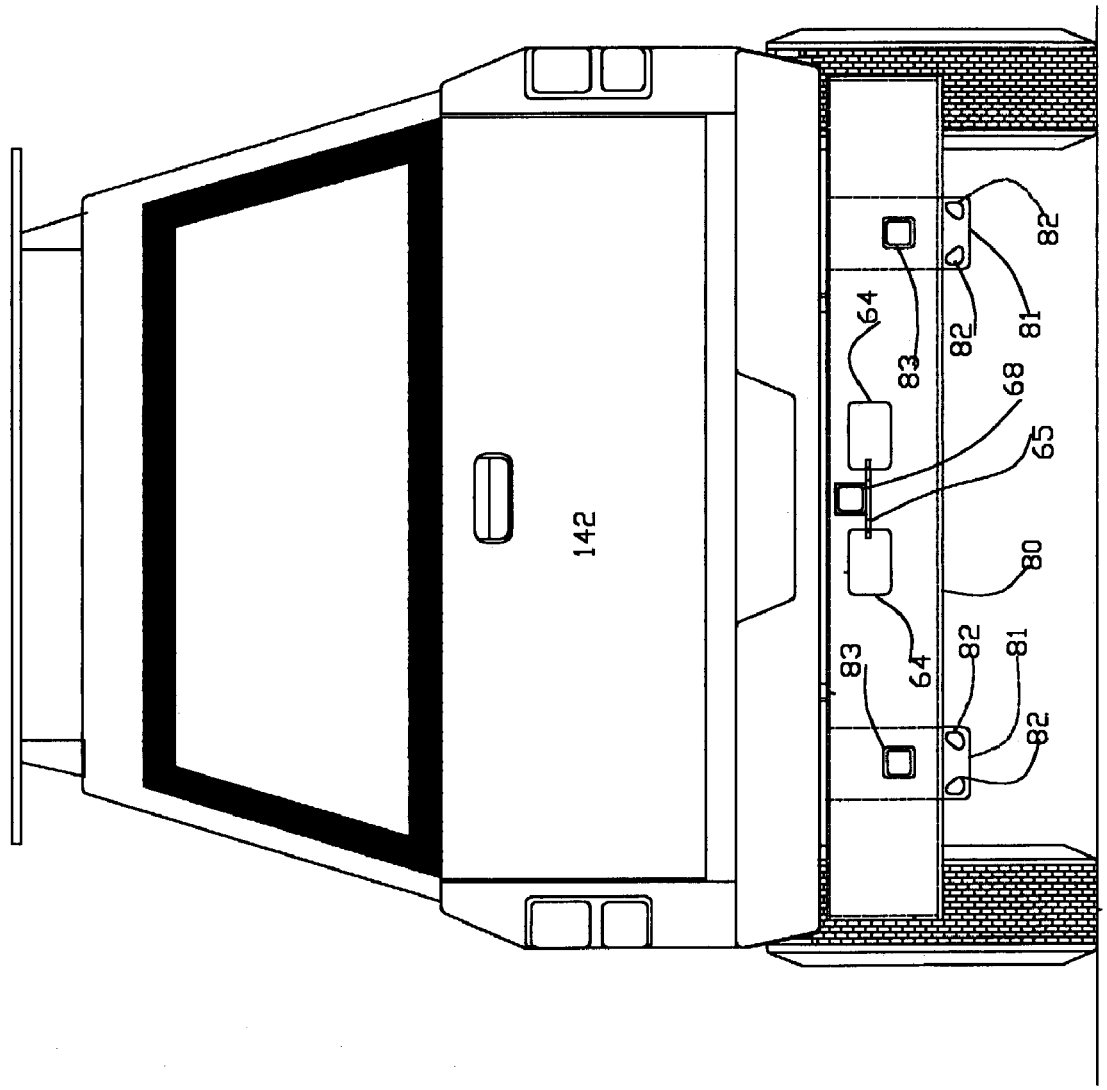
FIG. 18 is a rear elevation of a pickup truck showing the approximate location of a full width lower protective bumper with the center receiver and the two accessory receivers, left and right and the safety chain attachment plates for each.
Figure 19:
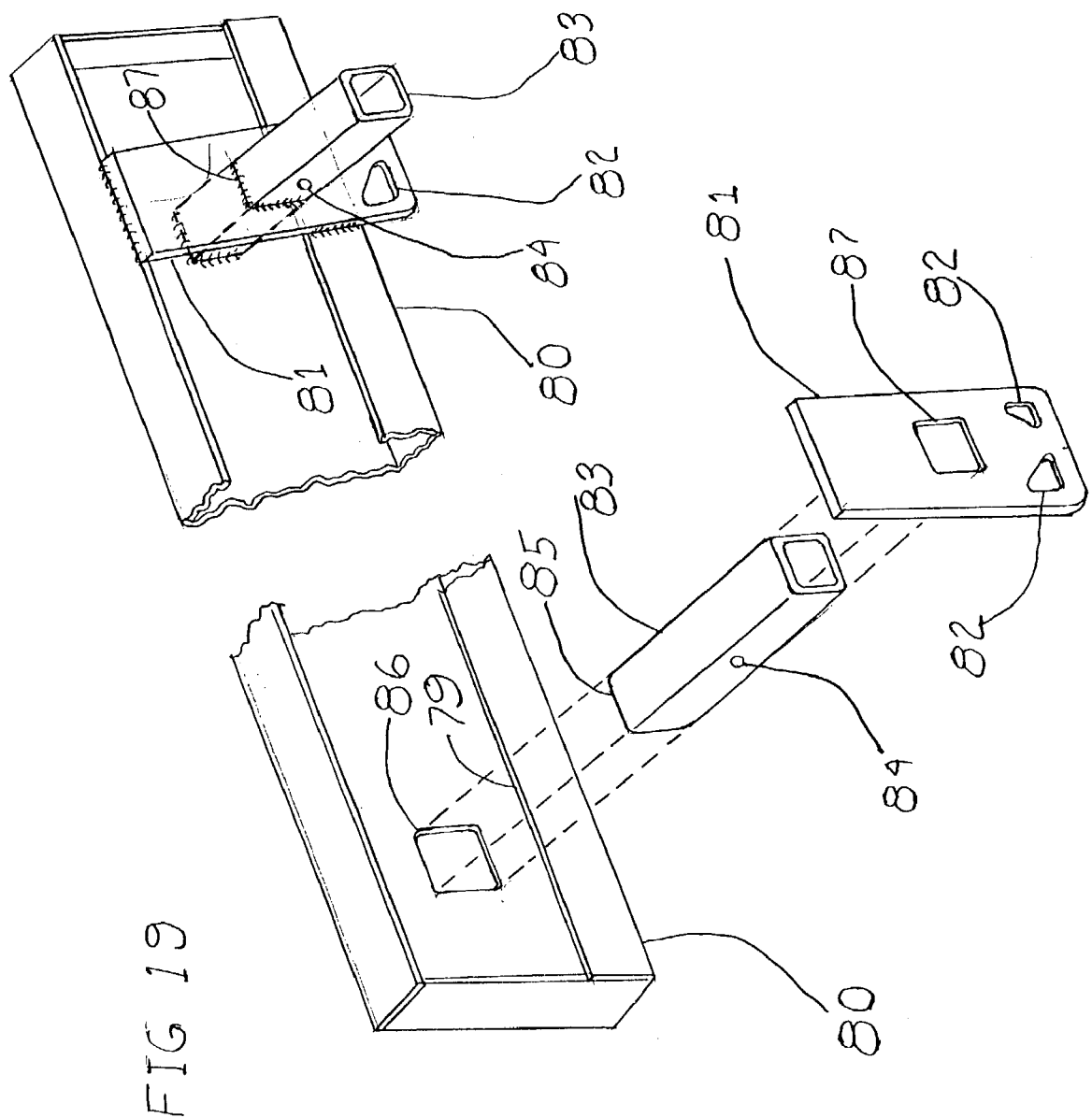
FIG. 19 is an isometric drawing of a full width lower bumper, rear view and omitting the center receiver, chain attachment plate, and hand holes, to show more clearly the fabrication details on the rear of the bumper, for the two accessory receivers

FIG. 18 shows a full width version of the mini bumper 80 in place on the back of a pickup truck 142, with a center receiver and two rearward facing accessory receivers, all with flush mounts and easily accessible safety chain plates. FIG. 19 has a rear view of the two ends of the full width bumper 80 showing the "accessory receiver" parts assembly on the left and the completely assembled "accessory receiver" on the right. The receiver tube 83 is welded into hole 86 in the face of the shell 80. The receiver tube 83 also is welded to the turned up leg of the shell 79. A heavier gauge metal plate 81 encircles the receiver tube and is welded to it 83 as well as to the top and bottom of the rear of the full width shell 80. This same plate serves as the safety chain plate, with holes 82 exposed under the face of the lower bumper for easy attachment of the safety chains This full width lower bumper 80 also has a frame support system as shown on FIG. 8 of the mini bumper drawing, giving it 80 the same structural support that current trailer hitches have, enabling it 80 to do all of the functions of a receiver type trailer hitch plus providing a lower safety bumper with a protrusion free surface.

Figure 20:
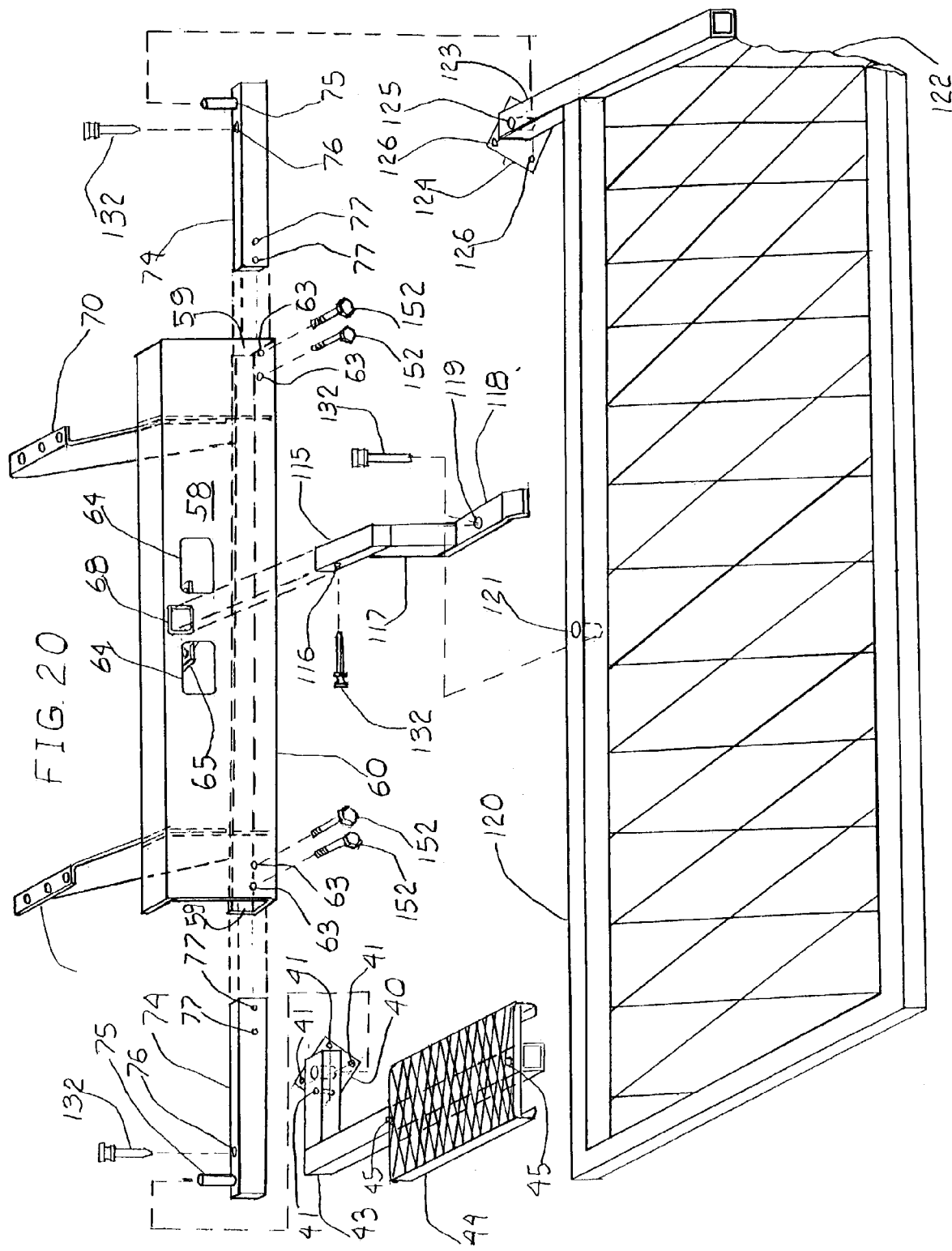
FIG. 20 is an isometric drawing showing a mini bumper with two rotatable accessory assemblies installed on a mini bumper, a rotatable step on the left and a rotatable cargo tray on the left, showing the versatility of the different adaptations of my invention.

FIG. 20 gives a sample of how a mini bumper can be utilized for mounting two different rotatable accessory devices. On the left, mounted in the receiver opening 59 and secured by bolts with nuts 152 going through holes 63 and 77, is a pivot pin bar assembly having parts 74 to 77, onto which is mounted the step assembly, with components 40 through 45. As in previously presented designs, the bushing hole 42 is mounted on the pivot pin 75, and a hitch pin 132 secures the step in one of the working or stowage positions by being inserted into one of the four index holes 41 and the locking hole 76. On the right side of the mini bumper an identical except slightly longer, pivot pin bar, having parts 74 to 77, is inserted into the receiver opening 59. On this pivot pin 75 a rotary cargo tray is installed, using bushing hole 125, with a similar index locking plate 124 having a choice of three locking holes 126, with three corresponding stationary cargo tray positions. The cargo tray 120 positions are; A. travel position—covering the full width of the truck or other vehicle with a rear door access, and occupying less in depth. B. rear door access position—in situations where the cargo tray 120 is loaded and rear door access is required, the cargo tray 120 can be unloaded and dismantled or it may be pivoted out of the way 90 degree, using prior art. C. loading or unloading position from another vehicle parked parallel and forward of the cargo tray equipped vehicle. The C position for the cargo tray is achieved by rotating the tray 180 degrees from the travel position behind the truck or van.

Included in FIG. 20 is a "pivot platform support" which is insertable into a center receiver or an accessory receiver, with parts numbered 115 to 119. The receiver insertable bar 115 having a hitch pin securing hole 116, also has a vertical member 117 to attain the correct height, and an engagement plate 118 with a pin locking hole 119. In use the "pivot platform support" is inserted and locked in a receiver 68 with a hitch pin 132 and the cargo tray, or pivot platform 120 rests on the engagement plate 118 with holes 121 and 119 being penetrated by a hitch pin 132, to provide a secure support for the rotatable cargo tray 120, while the vehicle is traveling.

Figure 21:
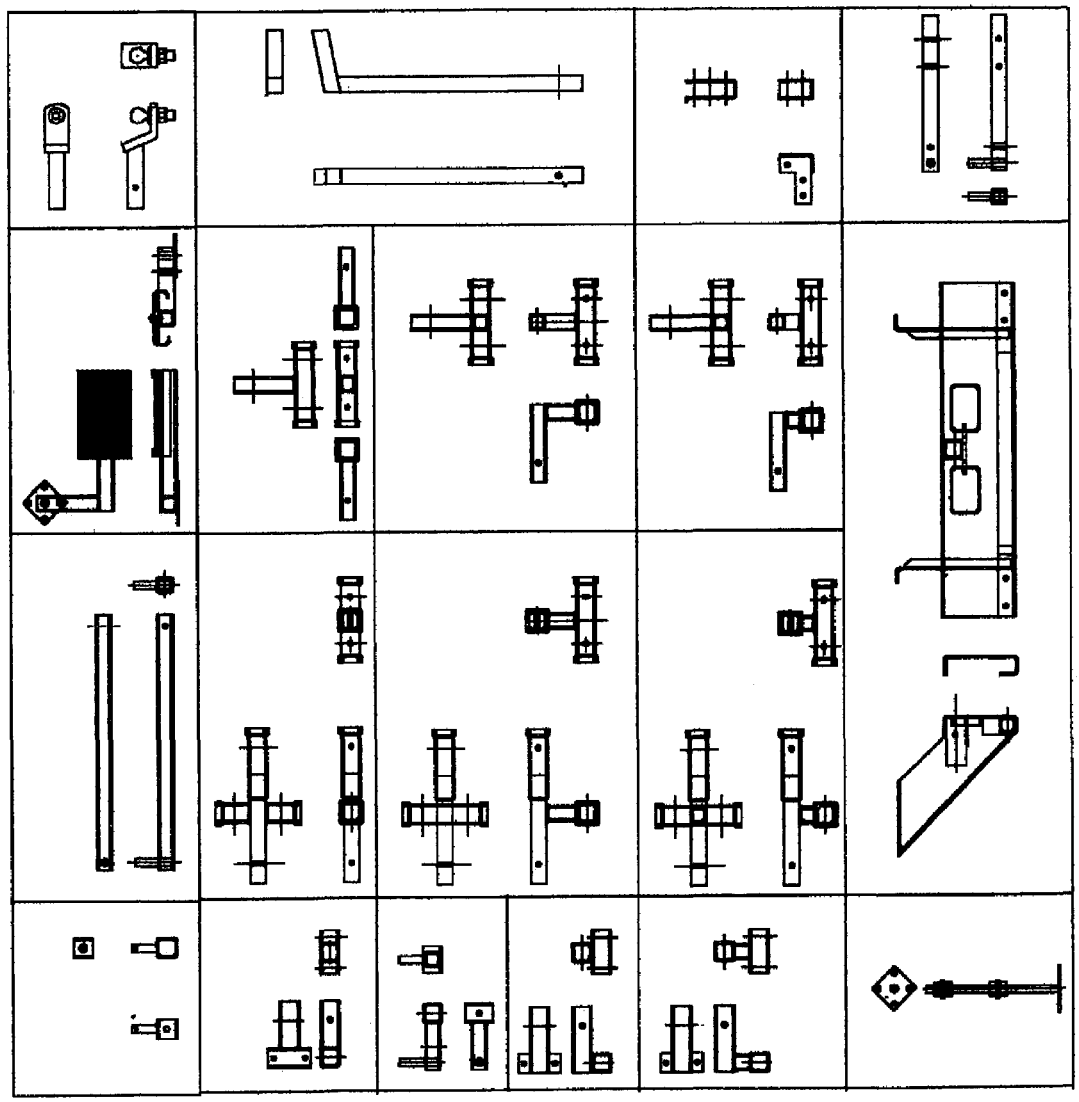
FIG. 21 is a typical software compilation of standard components manufactured for dealer use and in preparing rotatable step assembly computer drawings for customer acceptance and final shop assembly.

FIG. 21 is representative of the standard components presented by the company, for use in developing scaled drawings of the rotatable step. The parts, standard components are all on floppy disks, cd rom, or the like, each presented in three or four views to give all sides of the part. On the computer, with software such as AUTOCAD, having it's own registered trademark, any of the views of a part may be selected [cut] from the company supplied disks, and placed in a hold situation [paste] for later use. Further, from the company supplied disk, a rear or side view of a certain model vehicle can be placed on the monitor, the parts being held can be moved into the proper position in relation to the vehicle, and imprinted there. So the four step CAD drawing process for drawing a rotatable step on the rear of a pickup truck would be; [for reference use FIGS. 1 and 3]. 1 Pull up the rear view image of a Dodge 4×4 pickup truck, 1997 year, from the company supplied disk, and imprint it on a new CAD drawing. 2 Pull up from the standard components FIG. 21, the rear view of an "accessory receiver" parts numbering 30 through 36, with the proper vertical elevation, and place it in the center receiver 130 of the vehicle drawing. 3 Pull up from the standard components FIG. 21, the rear view of "pivot pin bar" 37 and place it in position in either side of the accessory receiver 35, depending on customer preference, engaging the two holes numbered 36 with a hitch pin 132, using the cut and paste technique. 4. Pull up the "step assembly" drawing, parts 40 to 45, also from FIG. 21, and using the same process of cut and paste, install the new parts with hole 42 going on pivot pin 38. If the safety handle is also desired it may also be placed on the step assembly drawing at this time.

What if the customer, who probably has been watching this computer drawing process, feels a change is necessary? The computer program enables deletion of selected components and substitution of others from the same pictorial representation of the standard components FIG. 21, so any substitution of parts is possible. This is also where special customer ideas can be tried out first.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A rotatable step to assist a person entering into a vehicle or climbing onto a machine comprising:
   a pivot bar having a first end adapted to couple to a vehicle or machine at a central extent thereof and a second end with a pivot device laterally off set from the first end;
   a step with a nonskid tread large enough to hold a pair of feet of a person entering into the vehicle;
   a step support having two legs attached to one another forming an included angle of less than 180 degrees, with the ability to accept the step for either left or right hand use at one end of the step support, and rotatably secured to the second end of the pivot bar; and
   a locking plate coupled to the step support, the locking plate having a center hole adapted to receive the pivot device and rotatably secure the step support to the second end of the pivot bar.

2. A rotatable step according to claim 1 also having a safety handle which can be inserted into an orifice in the step support and removed for storage or vehicle travel.

3. A rotatable step according to claim 1 also having an adapter assembly with a double entry receiver tube enabling devices to be installed for use in either left or right hand, or both simultaneously with various accessories.

4. A rotatable step according to claim 1 also comprising:
   an attachable adoption comprising fastening means for accessory receivers, by clamping on to existing trailer hitches or the like and providing accessory receivers to the extreme left and right ends of the commercially available trailer hitches, into which devices such as a rotatable step may be installed giving simultaneous left and right hand accessory mounting ability, or dual mounted accessories requiring increased stability.

5. A rotatable step according to claim 1 also comprising:
a modification to existing prior art in trailer hitch design, providing a means to use either or both of the open ends of the main horizontal support tube of the trailer hitch as individual or dual receivers to accept various accessory devices, including pivot bars with adoptions as required to satisfy the location requirements for positioning devices such as pivot pins.

6. A rotatable step according to claims 1 or 3 having a center receiver extension bar with an extension receiver mounted to the extension bar, so that the center receiver can be used by other accessories or for attachment of a trailer pulling device.

7. A rotatable step according to claim 1 also comprising:
a modification to existing prior art in trailer hitch design, providing a means of fastening on an accessory receiver clamping device which can be secured to a main horizontal support tube of a commercially available trailer hitch as single or multiple accessory receivers.

8. A rotatable step to assist a person entering into a vehicle comprising:

a pivot bar having a first end adapted to couple to a vehicle or machine at a central extent thereof and a second end with a pivot device laterally off set from the first end;

a step with a nonslip tread large enough to hold a pair of feet of a person entering the vehicle with a removable tread plate to facilitate cleaning, exchange of tread plate configuration, or replacement;

a step support having two legs forming an included angle of less than 180 degrees, with the step support and step fabricated as one or more integral units, as in stamping, casting, molding, or other manufacturing means, in various materials, steel, cast iron, plastic, or other materials, and rotatably secured to the end of the pivot bar;

a locking plate coupled to the step support, the locking plate having a center hole adapted to receive the pivot device and rotatably secure the step support to the second end of the pivot bar.

* * * * *